US006538767B1

(12) United States Patent
Over et al.

(10) Patent No.: US 6,538,767 B1
(45) Date of Patent: Mar. 25, 2003

(54) METHODS AND SYSTEMS FOR PRINTING ON SPHERICAL OBJECTS

(75) Inventors: Alan E. Over, Duluth, GA (US); Fred Martin, Knoxville, TN (US)

(73) Assignee: Designer Image Technologies, Inc., Duluth, GA (US)

(*) Notice: Subject to any disclaimer, the term of this patent is extended or adjusted under 35 U.S.C. 154(b) by 0 days.

(21) Appl. No.: 09/493,412

(22) Filed: Jan. 29, 2000

Related U.S. Application Data

(60) Provisional application No. 60/122,237, filed on Mar. 1, 1999.

(51) Int. Cl.$^{7}$ .................................................. G06K 15/00

(52) U.S. Cl. ........................................ 358/1.18; 358/1.5

(58) Field of Search ........................... 358/1.1, 1.3, 1.4, 358/1.5, 1.7, 1.8, 1.18; 346/145, 111, 112, 116, 128; 400/112, 113, 114, 115, 139–145.1; 101/35–44

(56) References Cited

U.S. PATENT DOCUMENTS 4,506,999 A * 3/1985 Robertson ................... 101/3.1
5,435,215 A * 7/1995 Thompson-Oram ............ 142/1

* cited by examiner

*Primary Examiner*—Arthur G. Evans
(74) *Attorney, Agent, or Firm*—Geoff L. Sutcliffe; Kilpatrick Stockton LLP

(57) ABSTRACT

A printing system and method applies images to an object, such as a golf ball, through the use of one or more print heads. The object is mounted in a manipulator assembly that rotates the object as the image is transferred to the object. The print head is also movable with respect to the object so that it is at a desired distance from the object as it prints from one end of the object to the other. A plurality of print heads may be provided with each print head applying a different color to the object. These print heads may be arranged in a vertical fashion with the object traveling in a vertical direction between the print heads or the object may be mounted on a rotatable table with the print heads situated about the perimeter of the table. Images to be applied to the object are broken down into their constituent colors with the image data for each color being provided to a separate print head. The image data for each color is further broken down into individual tracks that are successively applied to the object. The system may be used to print images on a plurality of objects that are automatically routed through the system.

57 Claims, 21 Drawing Sheets

METHODS AND SYSTEMS FOR PRINTING ON SPHERICAL OBJECTS

This application claims priority to, and incorporates by reference, now abandoned provisional patent application Ser. No. 60/122,237, filed on Mar. 1, 1999.

FIELD OF THE INVENTION

The present invention relates generally to methods and systems for printing on objects, and, more particularly, to methods and systems for applying images to golf balls, ornaments, and other spherical, semi-spherical, or other objects having curved, non-planar, or non-linear surfaces.

BACKGROUND OF THE INVENTION

Techniques for applying images to objects having curved, non-planar, or non-linear surfaces are generally limited. One approach has to been to apply a decal to the surface and then spray the object with a clear overcoat finish. The use of decals is somewhat cumbersome. For example, when the spherical objects are golf balls, the decals are typically provided to the golf ball manufacturer by an outside vendor. The decals are relatively expensive and the process of applying the decals to the surfaces of the golf balls is labor-intensive. In addition to being expensive, the use of decals also limits the type of images that may be applied to the objects. Decals are typically made using a silk screening process that cannot provide many types of images, such as images with shading.

Pad printing is another technique for applying images to an object. Examples of pad printing systems are disclosed in U.S. Pat. No. 5,537,921 to Adner et al. and in U.S. Pat. No. 5,806,419 to Adner et al., the disclosures of which are hereby incorporated by reference. Although the pad printing technique eliminates the need for decals, the pad printing technique is also complicated and has its own limitations. In general, pad printing involves forming an image pattern in a printing plate and passing an ink cup over the printing plate so as to fill the pattern in the plate with ink. As the ink cup passes over the printing plate, a blade contacts the plate and wipes off excess ink from the image pattern thereby leaving ink only in the grooves of the pattern. The ink is then transferred to a flexible pad, such as a flexible silicone pad, which is placed in contact with the image plate. The pad is then removed from the plate and then moved into contact with the surface to be printed, such as the surface of a golf ball.

The pad printing technique is limited in the types of images that can be applied to many objects. As discussed above, the pad printing technique involves the use of a printing plate engraved with an image pattern. Thus, when applying images to a golf ball, the pad printing system is limited to the pattern on the plate. To provide a different image on a golf ball, a new plate must be fabricated which has the desired image and this new plate must then be placed in the printing system. The process of exchanging the printing plates requires the system to be turned off, thereby wasting valuable time and money in the production of the golf balls. The printing plates themselves can be fabricated from relatively expensive materials and require some lead-time to engrave the image into the plates. Consequently, before a new image can be applied to the golf ball, the system must wait for the new plate to be fabricated.

The typical pad printing system is also limited in the colors that may be applied to a golf ball. The pad printing systems typically include a number of wells for holding different colors of inks. Thus, the number of colors that may be applied to the golf ball is limited by the number of wells that form part of the printing system.

Another technique for applying images to a golf ball is disclosed in U.S. Pat. No. 5,778,793 to Mello et al., which is hereby incorporated by reference. This technique, as explained in the patent, overcomes some of the disadvantages of conventional pad printing systems and allows for the use of shading or multiple colors on golf balls. This technique involves the use of plates having a photo sensitive coating. The plate with the coating is exposed to an image and to ultra violet light. Portions of the plate that are not part of the image receive the ultra violet light and the coating becomes hardened. After an initial exposure, a screen film is applied over the plate and then the uncured coating is removed, such as in a water bath. Although the technique disclosed in the patent to Mello et al. allows for greater variety of images that may be applied to a golf ball, the printing technique still involves the use of a printing plate or cliche. The technique disclosed in the Mello et al. patent suffers from many of the same disadvantages as other pad printing systems.

U.S. Pat. No. 5,831,641 to Carlson, which is incorporated herein by reference, describes another type of system for printing on objects. This system discloses the use of an ink jet plotter to apply images to a baseball bat. The system also includes a mechanism for holding, positioning, and rotating the bat relative to the ink jet plotter. This type of system advantageously can apply images to objects having non-linear surfaces, such as a baseball bat. As described in this patent, the ink jet plotter moves along a linear axis and applies images to portions of the bat. The bat is divided in three sections with a first section being the end of the bat, the second section being a tapered middle section, and the third section being the handle. The bat is held by a mechanism that pivots the bat so that the bat presents a planar surface to the ink jet plotter. Thus, the system treats each section as a planar surface as it applies the image to the bat.

The system described in the Carlson patent has several shortcomings. For one, the system is limited to three-dimensional objects that have cylindrical sections. The ink jet plotter travels on a linear axis and is therefore only able to apply images to surfaces of the object that are parallel the travel axis of the plotter. Many three dimensional objects, such as balls and ornaments, do not present planar surfaces upon which Carlson's plotter can apply an image. Thus, the Carlson patent is limited in the types of objects that may be imaged.

SUMMARY OF THE INVENTION

The present invention addresses the problems described above by providing methods and systems for printing images on objects having curved, non-planar, or non-linear surfaces. These objects include, but are not limited to, spherical objects such as ornaments, semi-spherical objects such as golf balls, baseballs, or basketballs, and other objects such as eggs, and footballs. A system according to a preferred embodiment of the invention includes a graphics unit that is movable with respect to the object with this graphics unit preferably being an ink jet unit. Graphical information representing the desired graphics on the object is received and is processed into image data. The image data for a desired image to be applied to the object is processed into individual tracks of data to be applied to the object. Each track of data is then transferred to the print head and the position between the print head and the object is controlled so that the track of the desired image is applied to a particular track on the object. In the preferred embodiment, the object is a golf ball and is held and rotated as the print head applies the image to the ball. The print head is also preferably movable with respect to the ball so that the print head is at an optimal position relative to the ball.

The printing systems and methods according to the invention are not limited to a single color. Multiple colors may be applied to an object through the use of multiple graphics units. The invention preferably uses processed color or digital imaging which enables the printing of about 16 million colors. The inks are preferably translucent inks but may comprise any other suitable ink, such as opaque ink or even edible inks. According to one example, the object may be mounted on an indexed table and after printing with one color the object is moved to another print head for the printing of a second color. An intermediate station between the application of two inks may be necessary to allow for the curing or drying of the ink. The objects may be mounted on a table that rotates the object to each successive position or may be mounted on an assembly that moves along a straight path between the print heads. Furthermore, the systems and methods according to the invention are able to maintain the object at a desired position between print heads. Since the position of the object relative to its spin axis is always known, the images from the different colored print heads can be merged to create a desired image having virtually any color.

The invention may be used to apply images to a variety of three-dimensional objects. As discussed above, the invention is not limited to objects having planar or cylindrical surfaces but may be used to apply images to spherical or semi-spherical objects. For instance, the invention preferably has an ink jet plotter that moves about a curved surface and applies desired tracks of images to that curved surface.

According to a further aspect of the invention, a facility for printing images on a plurality of objects includes a hopper or other container for holding the plurality of objects. These objects are then transferred from the hopper to the printing assembly, such as through a chute or other transfer device. The objects are then automatically placed within a manipulator assembly for holding the object and desired images are applied to the objects through one or more print heads. As discussed above, multiple colors may be applied to the object through the use of multiple print heads with each print head applying a different color. After the last color of ink has been applied to the object, the object may be automatically released and placed into a holding bin or sent to a subsequent apparatus for packaging of the objects.

The printing systems and methods according to the invention allow for the application of a greater variety of images. The systems and methods do not rely upon image plates nor do they require any type of cliche. Instead, any image that can be captured with a computer is broken down into its individual colors, its individual tracks, and each track is then applied to the object. Further, the printing systems and methods are not limited to just a portion of the object's surface but may be applied around the entire perimeter of the object. Because the printing systems and methods do not use any image plate, the image that is applied to the object can be quickly and easily changed.

Accordingly, it is an object of the present invention to provide systems, methods, and assemblies for applying images to objects.

It is another object of the present invention to provide systems, methods, and assemblies for applying images to spherical or semi-spherical objects or objects having curved or non-linear surfaces.

It is a further object of the present invention to provide systems, methods, and assemblies for applying images to objects in which the image can be quickly and easily changed.

It is still a further object of the present invention to provide systems, methods, and assemblies for applying images to objects in multiple colors and in various degrees of resolution.

It is yet another object of the present invention to provide systems, methods, and assemblies for applying images to a plurality of objects.

It is still another object of the present invention to provide systems, methods, and assemblies that do not require image plates or cliches.

Other objects, features, and advantages of the present invention will become apparent with respect to the remainder of this document.

BRIEF DESCRIPTION OF THE DRAWINGS

The accompanying drawings, which are incorporated in and form a part of the specification, illustrate preferred embodiments of the present invention and, together with the description, disclose the principles of the invention. In the drawings.

DETAILED DESCRIPTION

Reference will now be made in detail to preferred embodiments of the invention, non-limiting examples of which are illustrated in the accompanying drawings.

I. Overview

Figure 1:
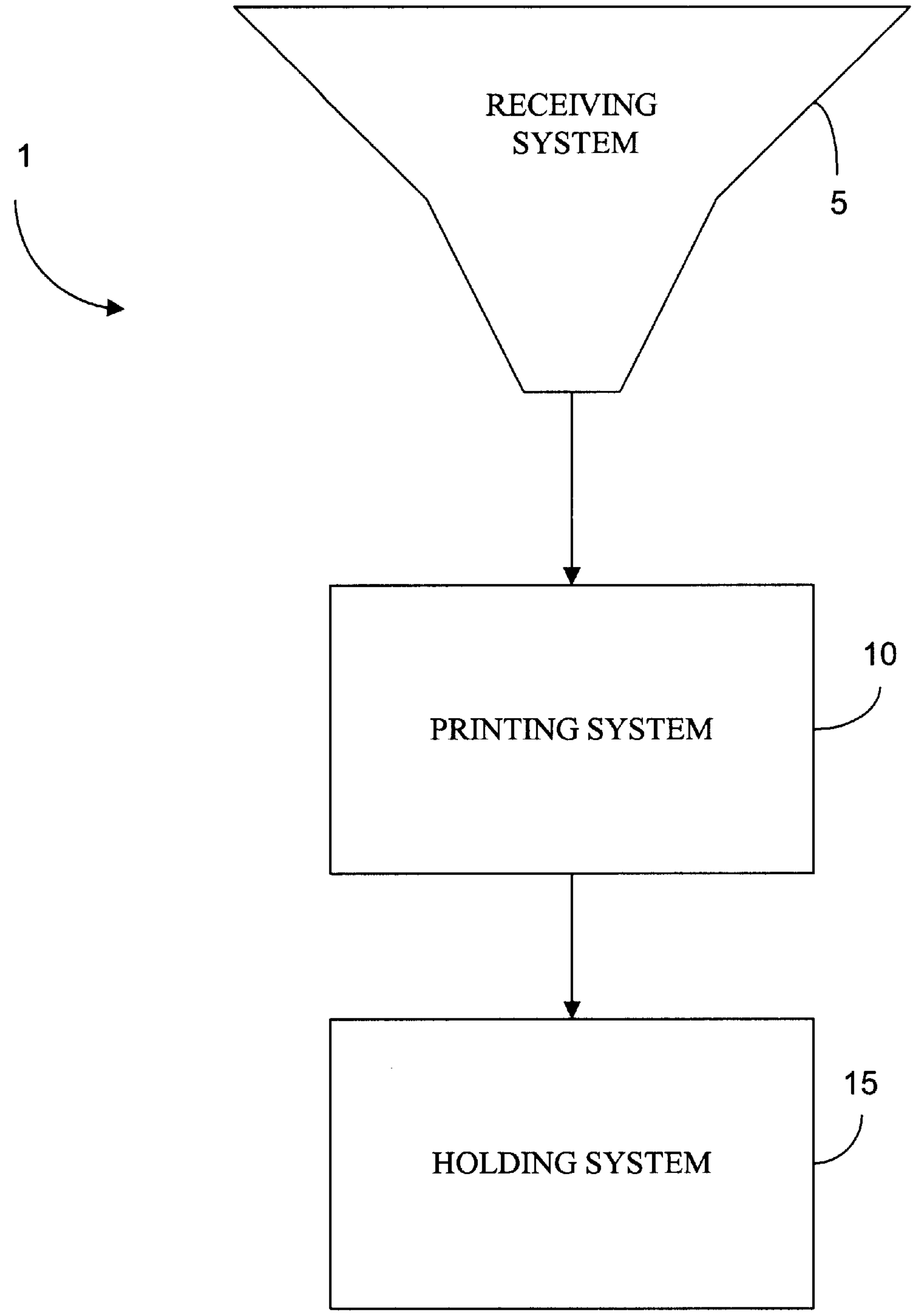
FIG. 1 is a block diagram of a block diagram of a facility for receiving a plurality of objects, for applying graphics to the objects, and for packaging the objects.

With reference to FIG. 1, a facility 1 for printing on objects includes a receiving system 5, a printing system 10, and a holding system 15. The facility 1 can be used to print on various types of objects, including, but not limited to, spherical objects, semi-spherical objects, objects having curved surfaces, objects having non-linear surfaces, or objects having non-planar surfaces. Some examples of such objects include ornaments, baseballs, basketballs, golf balls, tennis balls, soccer balls, footballs, eggs, baseball bats, cups, blocks, and cylinders. Furthermore, while the invention advantageously allows graphics to be applied to objects with difficult surfaces, the invention can also be used to apply graphics on objects having planar or linear surfaces, such as blocks. Moreover, the invention can be used to apply graphics to objects having a combination of different surfaces, such as a planar surface flanked on either end with curved edges.

The precise structure of the receiving system 5, printing system 10, and holding system 15 will vary with the exact object to which graphics are being applied. As one example, the receiving system 5 may comprise a hopper for holding a plurality of objects and a chute for delivering the objects to the printing system 10. The chute, for instance, may separate out individual objects and deliver each object to the printing system 10. The receiving system 5 may also perform some pre-processing of the objects. For example, it may be necessary to prepare the surfaces of an object in preparation of graphics being applied by the printing system 10.

An example of the printing system 10 will be described in more detail below. In general, the printing system 10 applies graphics to each object and can apply the graphics over difficult surfaces on the object. The printing system 10 preferably uses an ink jet to apply the ink to the objects, although the printing system 10 may alternatively use other types of mechanisms for delivering ink to the object. The invention is not limited to any particular type of ink since the ink or other substance applied to the object to impart the desired graphics may vary with the precise type of object. For instance, the ink is selected based on the surface properties of the object to ensure the desired adhesion and is also selected to create the desired graphical effect. The ink used in the printing system may also be selected based on other properties of the object or the desired effect or function. For instance, both the object and the ink may be edible, in which case the ink may comprise a frosting or other edible coating.

The precise structure and function of the holding system 15 will also vary with the type of object and with the operations of the particular facility 1. As one example, the holding system 15 comprises a holding bin that receives the objects directly from the printing system 10. As another example, the holding system 15 includes a packaging assembly for gathering sets of the objects and placing them into packages. The objects may be packaged individually, such as an individual baseball, or in groups, such as a package of three golf balls. Furthermore, the holding system 15 may be a subsequent stage for processing of the objects before they are packaged or shipped.

II. Printing System

Figure 2:
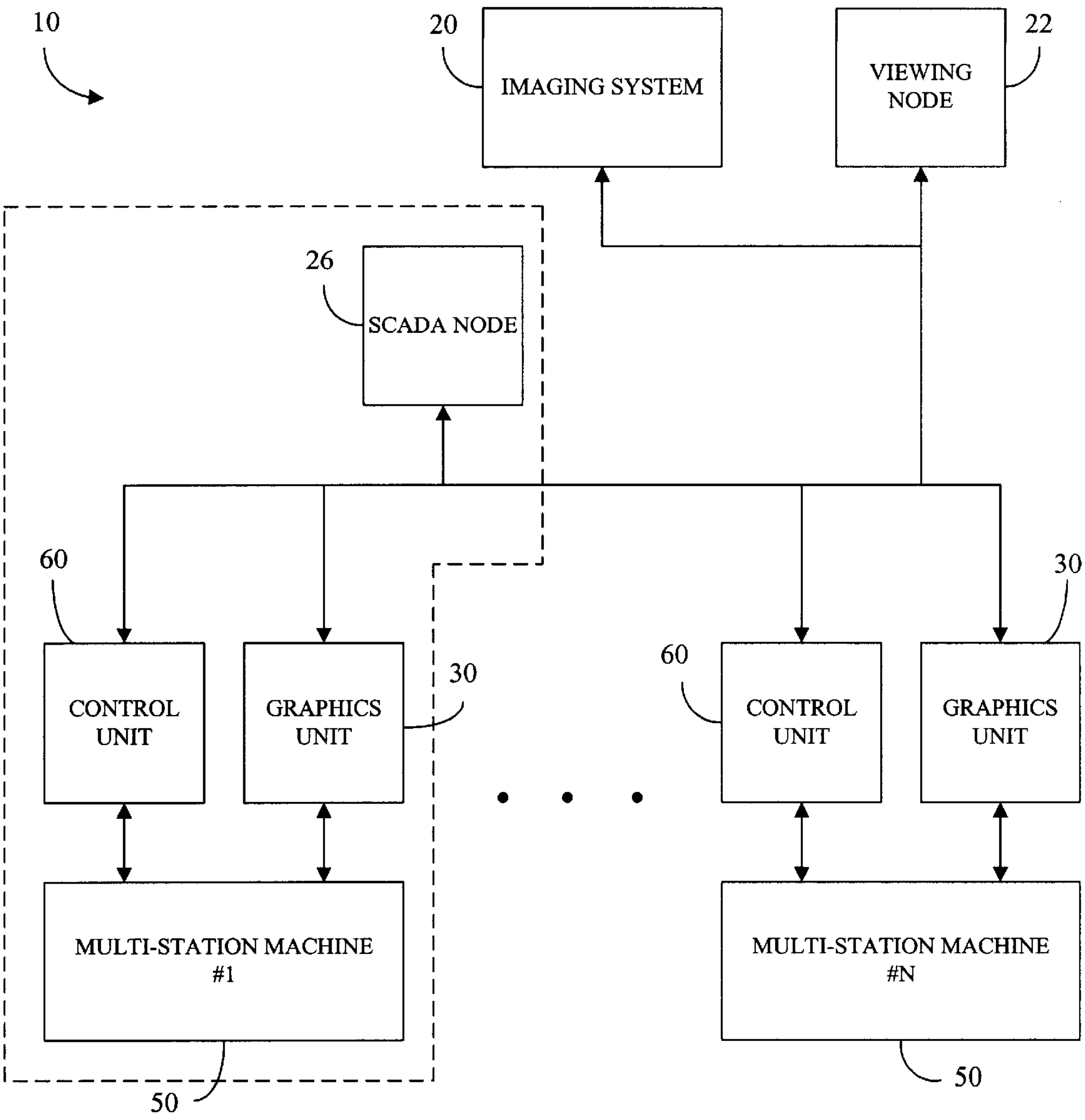
FIG. 2 is a block diagram of a preferred embodiment of a printing system for use in the facility of FIG. 1.

An example of the printing system 10 according to a preferred embodiment will now be described with reference to FIG. 2. The printing system 10 includes an imaging system 20 for receiving information on the desired graphics to be applied to the object. The imaging system 20 can acquire this graphical information in any suitable manner. For instance, the imaging system 20 may receive the information directly through user input at the imaging system 20, such as through a scanner, keyboard, mouse, or other suitable input devices. Alternatively, the imaging system 20 may receive the graphical information from remote users or customers. For instance, the imaging system 20 may be connected to a network, such as Local Area Network (LAN) or a Wide Area Network (WAN), or the imaging system 20 may receive graphical information through the Internet. Administrators of the facility 1 can therefore remotely enter or select the desired graphical information or customers of the objects may enter or select the graphics that should be applied to their objects. The imaging system 20 may present a set of graphics from which the administrator or customer can select or can receive the graphical information from the administrator or customer.

The imaging system 20 processes the graphical information and supplies the processed graphics data to the graphics unit 30, such as through an RS485 interface. The printing system 10 may include a single graphics unit 30 for applying graphics to objects, or as shown in FIG. 2, may include a plurality of such graphics unit 30. The graphics unit 30 may be capable of printing in a plurality of colors or a single color. If the graphics unit 30 is capable of printing in just one color, multiple graphics units 30 are preferably available in order to apply multi-colored graphics. Multiple graphics units 30 are also desirable so that graphics may be simultaneously applied to multiple objects.

The imaging system 20 also generates commands that are transferred to the control unit 60. The control unit 60, as will be described in more detail below, controls the position of the object relative to the graphics unit 30 and allows the graphics unit 30 to apply graphics to objects having difficult surfaces, such as non-linear, non-planar, or curved surfaces. The control unit 60 enables the application of graphics to such objects by maintaining the object at a desired distance or within an acceptable range of distances relative to the graphics unit 30 during the application process.

When using more than one graphics unit 30, the printing system 10 preferably includes a multi-station machine 50. At times, it may be desirable or necessary to use more than one graphics unit 30 for applying graphics to a single object, such as with multi-colored graphics. In these cases, multiple graphics units 30 may be grouped together with the multi-station machine 50. The multi-station machine 50 moves the object from one graphics unit 30 to a second graphics unit 30 or, alternatively, maintains the object stationary while the graphics units 30 are moved from object to object.

The printing system 10 also preferably includes a controller 23 for the multi-station machine 50, which in the preferred embodiment is a programmable logic controller (PLC). Each PLC controller 23 may be associated with a respective multi-station machine 50 or, alternatively, may control the operations of a plurality of multi-station machines 50. The PLC controller 23 performs a number of functions, including controlling indexing between stations with the multi-station machine 50, coordinating operations of the graphics units 30, and receiving data, such as alarm information, from the graphics units 30.

For some facilities, especially those with more than one multi-station machine 50, the printing system 10 advantageously has a Supervisory Control and Data Acquisition (SCADA) node 26 and a viewing node 22. The SCADA node 26 allows for the management and control of a plurality of PLC controllers 23, multi-station machines 50, control units 60, and graphics units 30. The printing system 10 preferably also has a viewing node 22 that allows operators to supervise operations of the system 10.

III. The Multi-station Machine

An example of a multi-station machine 50 will be described in more detail with reference to FIG. 3. The multi-station machine 50 includes an indexing table T that has nine stations S1 through S9. In this example, the multi-station machine 50 has four graphics units 30 for applying four sets of graphics, each one a different color. The multi-station machine 50 also has four drying stations with each drying station following one of the graphics units 30. Depending upon the type of ink or other substance applied to the object, the drying station may apply heat, such as blowing or radiating heat, or may direct radiation to the object, such as UV radiation in order to cure the ink.

A method of operation for the multi-station machine 50 will now be described with reference to FIG. 4. At 51, an object is loaded at station S1. The object can be loaded in any suitable manner such as with robotics or through a delivery mechanism forming part of the receiving system 5. After the object is loaded into the control unit 60, the object is then moved at 52 to station S2. Station S2 is associated with a graphics unit 30 and, at this station, a first set of graphics is applied to the object. Next, at 53, the object is moved to station S3, which is a drying station. At station S3, the first set of graphics that were applied with the graphics unit 30 at station S2 is allowed to dry. The drying station may involve the application of heat, such as blowing or radiating beat, or radiation, such as ultraviolet radiation. Next, at 54, the object is moved to station S4 for the application of a second set of graphics by the graphics unit 30. The second set of graphics may be in a different color than the first set of graphics. At 55, the object is moved to a second drying station for the drying of the second set of graphics. At 56, the object is moved to station S6 for the application of a third set of graphics with the graphics unit 30 and is then moved to station S7 at 57 for drying. A fourth set of graphics is applied at station S8 at 58 and then the object is moved to station S9 at 59 for drying of this fourth set of graphics. Also at 59, the object is unloaded from the multi-station machine 50.

Figure 3:
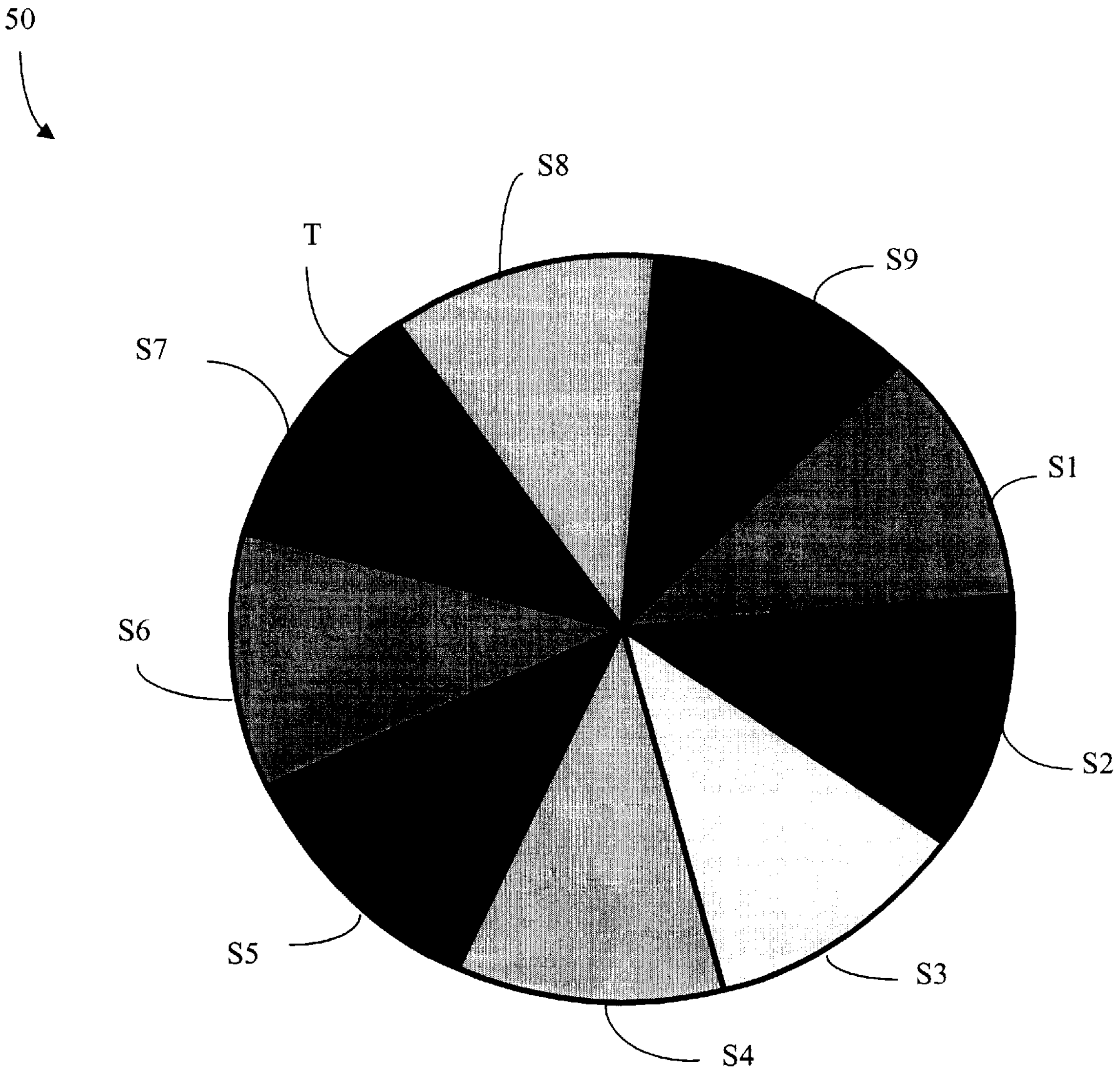
FIG. 3 is a diagram of a multi-station machine according to a preferred embodiment of the invention.
Figure 4:
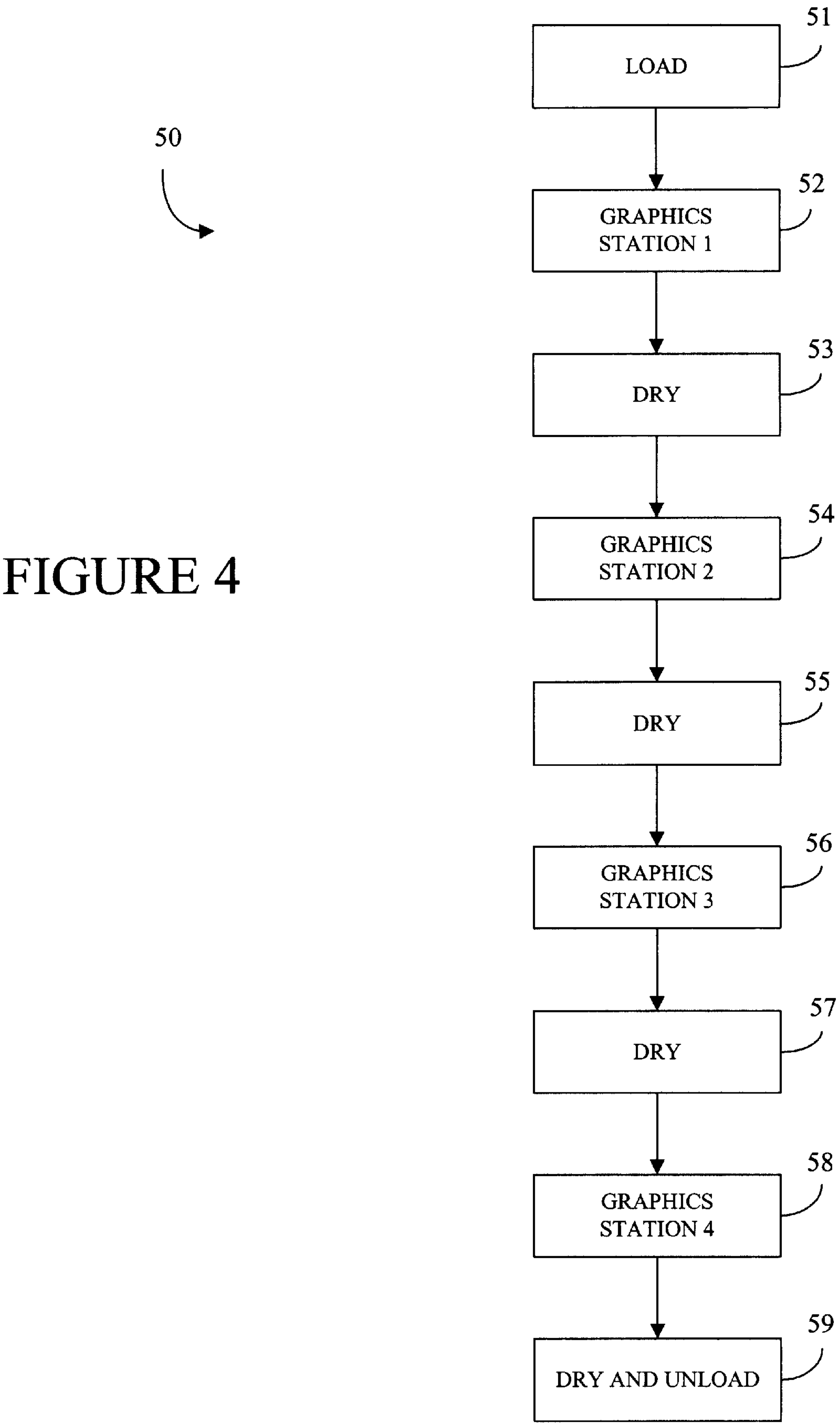
FIG. 4 is a flowchart depicting a method of operation for the multi-station machine of FIG. 3.

In the examples given with reference to FIGS. 3 and 4, the drying stations S3, S5, S7, and S9 are located after each station in which graphics are applied. It should be understood that it is possible for the objects to pass directly from one graphics unit 30 to a second graphics unit 30 without any intermediate station for drying. For instance, the object may remain at the graphics unit 30 for a period of time sufficient for the ink to dry. Also, the application of heat or energy to dry or cure the ink may occur at the same station where the graphics are being applied. Furthermore, it may be possible to apply graphics to an object before a previous set of graphics has completely dried. Additionally, rather than having intermediate: drying stations, a single and final drying station may be located on the multi-station machine 50 for the drying or curing of all sets of graphics.

With the multi-station machine 50 shown in FIG. 3, each station performs its associated function after an index or table rotation is complete and stabilized. A wait period may follow each rotation or index during which time, for instance, the object can continue to spin, the graphics may be allowed to dry, or nothing may happen. During an index, the control unit 60 moves its associated object from one station to the next station. In order words, in this example, the graphics units 30 are located outside the perimeter of the indexing table T and the control units 60 are located on the table T and are rotated along with the table T from one station to the next.

In another embodiment of the multi-station machine 50, the graphics units 30 may be spaced from each other so that the objects move along a path, such as a straight path, from one graphics unit 30 to the next graphics unit 30. For instance, the graphics units 30 may be housed in a kiosk. As with the indexing table T, the objects may be moved from one graphics unit 30 to the next or the graphics units 30 may move from object to object.

IV. Tracks

Applying graphics to a spherical or semi-spherical object presents several challenges. For one, the outer surface of the object is curved whereby the graphics unit 30 cannot simply follow a straight path when applying graphics to the object. Instead, the graphics unit 30 and the object need to maintain a desired spacing in order for the graphics to be properly applied to the object. The preferred manner for maintaining this spacing will be described in more detail below. In general, however, the spacing is maintained by moving the graphics unit 30 so that it generally follows the surface contour of the object.

Figure 5:
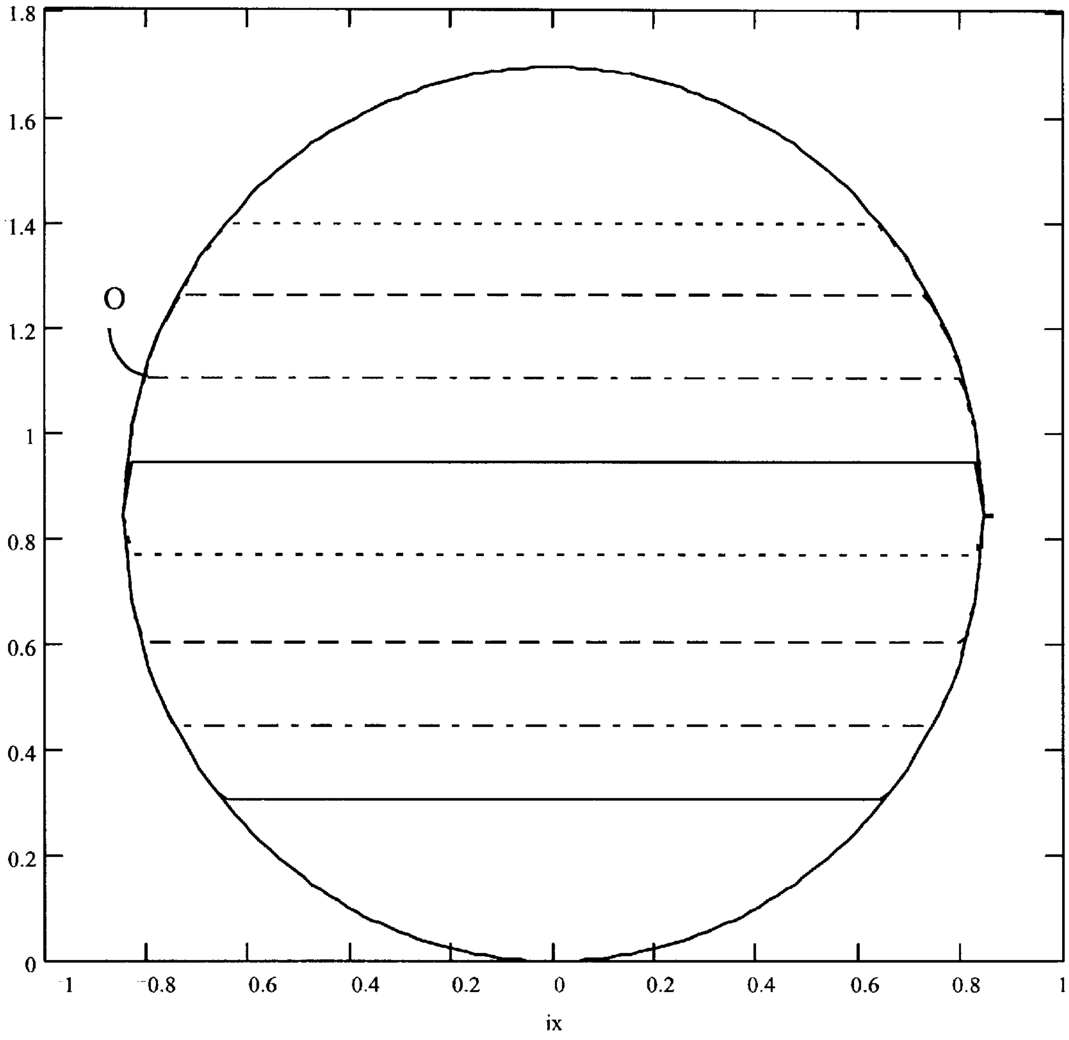
FIG. 5 is a diagram of an object divided into a plurality of tracks.

In addition to the challenge of maintaining a desired spacing, applying graphics to a spherical or semi-spherical object also involves a consideration of different track lengths. With reference to FIG. 5, in the preferred embodiment the object is divided into separate tracks and the graphics are applied sequentially to each track. In other words, the tracks near either end of the object O shown in FIG. 5 have a smaller length than the track near the middle or equator of the object O.

Another challenge when printing on a spherical or semi-spherical object is that the object may present different surface velocities along the surface of the object. For instance, with reference to the object O shown in FIG. 5, the object O is preferably rotated as the graphics unit 30 applies the graphics to a single track. If the object O is rotated at a constant angular velocity, then the track near the equator of the object O will have a higher surface velocity than tracks closer to the poles or ends of the object O. It is often desirable, however, to provide the highest quality graphics throughout the entire object O. For instance, the graphics unit 30 may have the capability of delivering 360 dots per inch (dpi) and it is desirable that the graphics have 360 dpi in each of the tracks.

Figure 6:
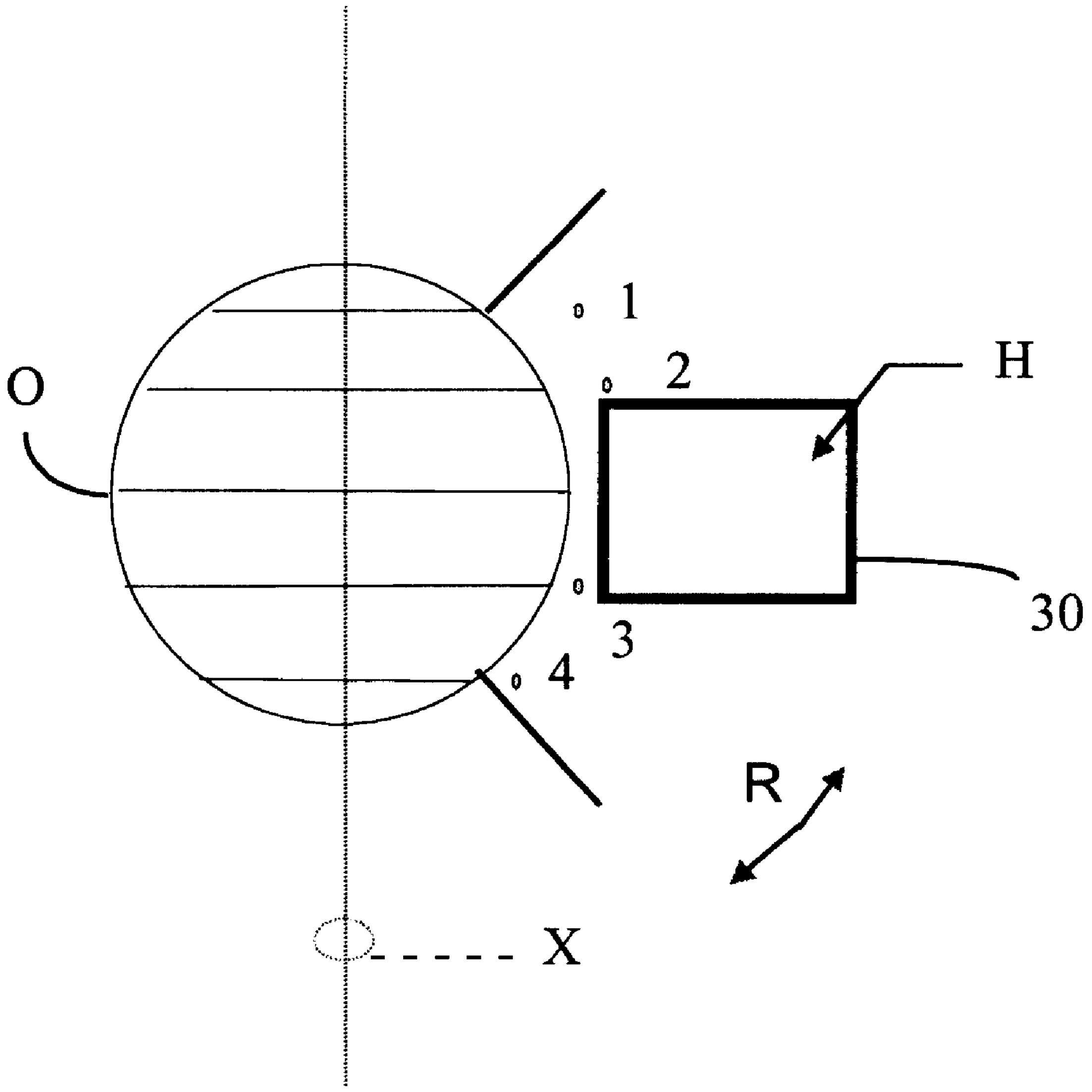
FIG. 6 is a diagram of an object showing the multiple positions of a graphics unit corresponding to the multiple tracks on the object.

With reference to FIG. 6, the object O is rotated about its spin axis X. The object O in this example is divided into five tracks with these five tracks being shown at positions 1, 2, 3, 4, and H. The home position labeled H is at the equator and is the position at which the graphics unit 30 is depicted. If the control unit 60 is placed at an angle, then the home position H will be at a location other than the equator. The application of graphics to the object O preferably follows the sequence of position 1, 2, 3, 4, and H. Thus, after a 360-degree track is completed, the graphics unit 30 is moved to the next position for printing on the next track. The graphics unit 30 preferably rotates about the axis R from one position to the next.

In this example, the object O is preferably a golf ball and has four tracks. The invention is not limited to any particular number of tracks and additional or fewer tracks may be provided. For instance, a golf ball may have eight tracks while a three-inch ornament may have fourteen or more tracks.

Figure 7:
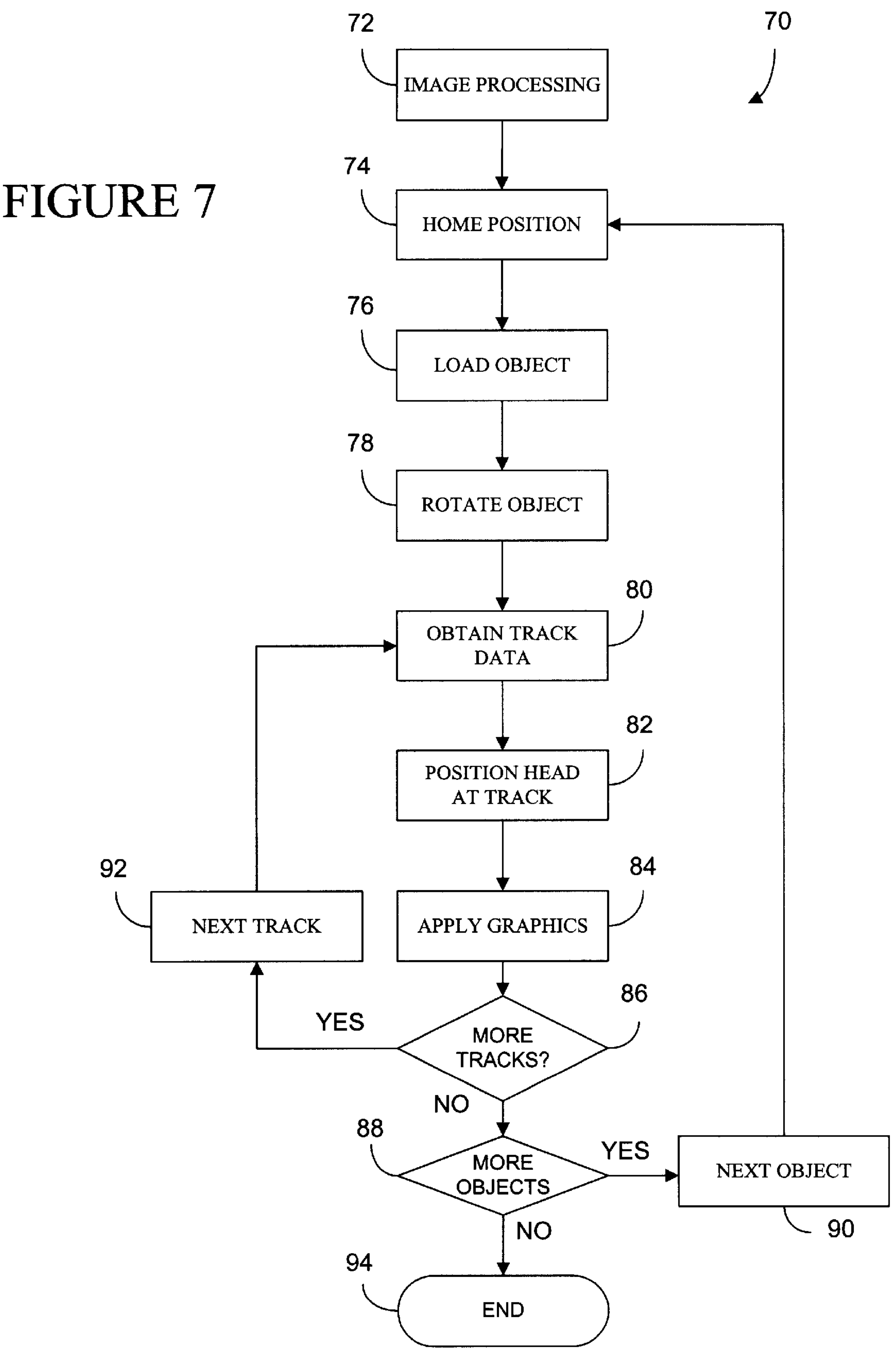
FIG. 7 is a flow chart depicting a method of applying graphics to a plurality of objects, each having a plurality of tracks.

A method 70 of printing on an object will now be described with reference to FIG. 7. At 72 the imaging system 20 first performs its processing. As described above, the image processing involves acquiring the desired graphics information and converting the graphics information into graphics data. At 74, the graphics unit 30 is placed in the home position H. Next, at 76, the object is loaded into a fixture, such as a nesting fixture that will be described in more detail below. At 78, the object is rotated up to a desired speed and then at 80 track data for the first track is obtained. The track data is preferably stripped from an image file and external RAM in the imaging system 20 and is transferred to the graphics unit 30. The graphics unit 30 is then positioned at the proper track at 82 and then at 84 the graphics for that track are applied to that object. Preferably, the graphics are applied to the object during one rotation of the object. At 86, an inquiry is made as to whether there are additional tracks, and, if so, processing proceeds to the next track at 92. While the object continues to spin, subsequent track data are obtained and graphics are applied to the subsequent tracks. After graphics have been applied to all tracks, at 88 an inquiry is next made as to whether graphics need to be applied to any additional objects. If so, the next object is acquired at 90 and the graphics unit 30 is returned to the home position at 74. The application of graphics to this next object then begins with loading the object at 76 and rotating the object at 78. The method 70 proceeds with subsequent objects until graphics have been applied to all objects at which point processing terminates at 94.

V. Image Processing

Figure 8A:
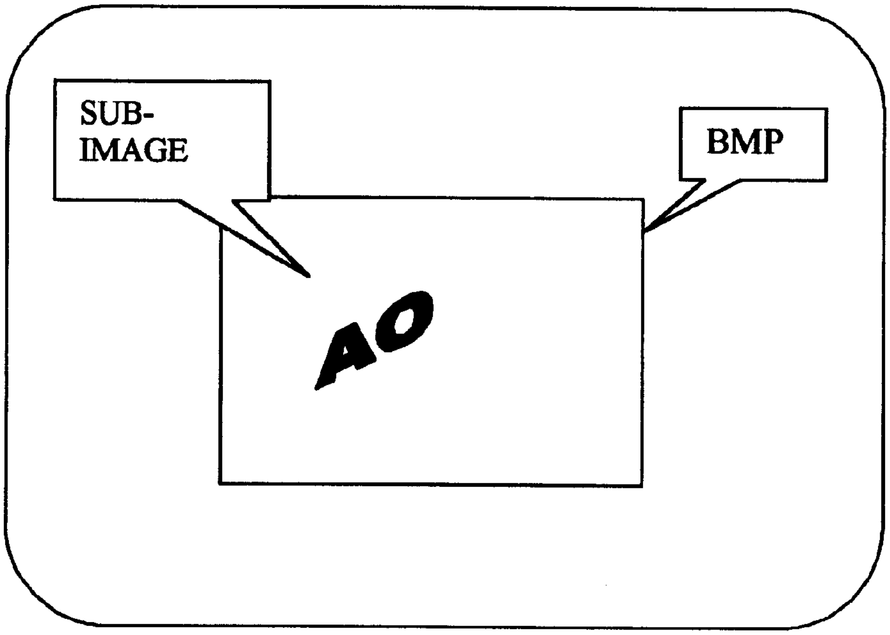
FIGS. 8(A) to 8(C) illustrate a process of converting graphics information, containing an image to appear on an object, into graphics data.
Figure 8B:
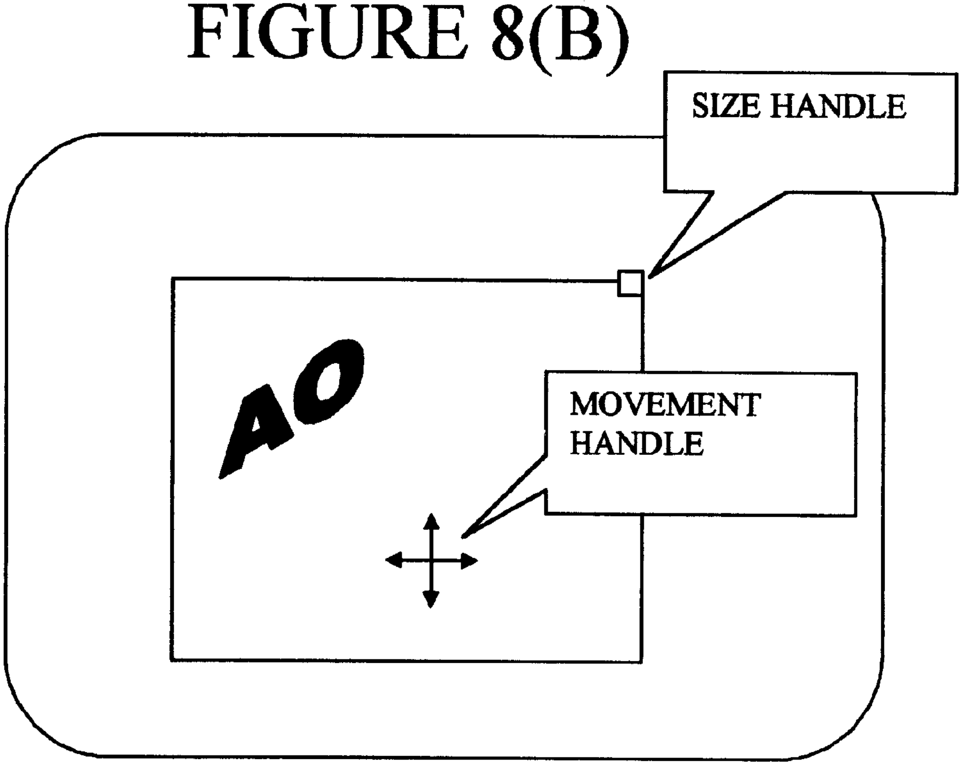
Figure 8C:
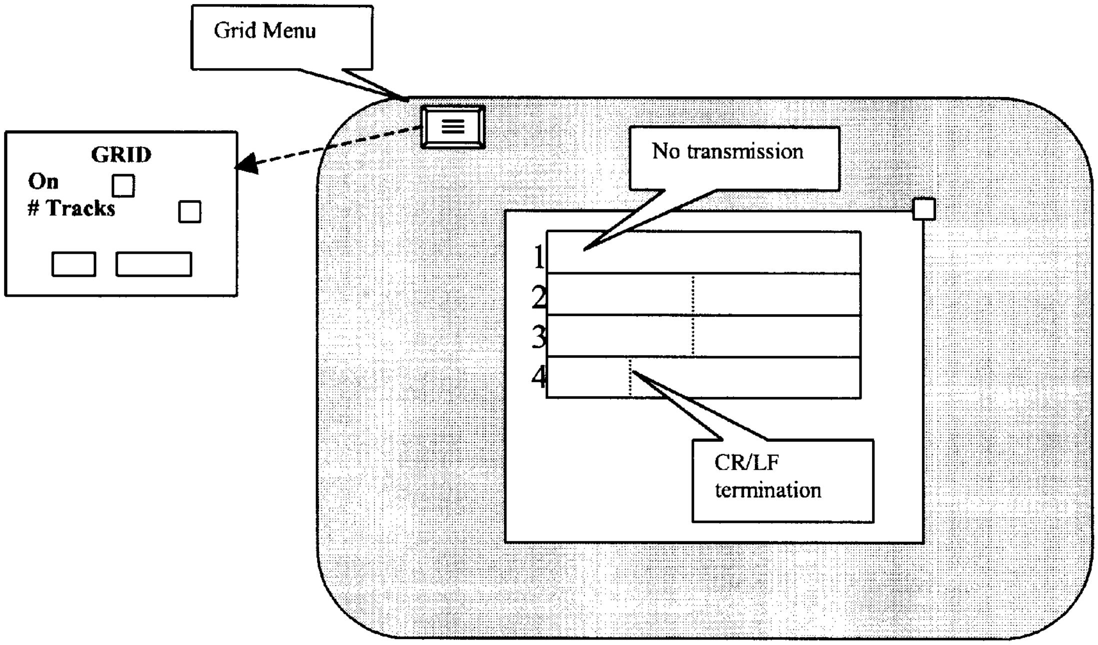

An exemplary method of processing graphical information into graphics data will now be described with reference to FIGS. 8(A) to 8(C). First, with reference to FIG. 8(A), the imaging system 20 receives graphical information such as bit map (.bmp) files, and generates the graphics data for the graphics unit 30. The bit map file shown in FIG. 8(A) includes a sub image depicting the letters (AO). The bit map file is resized so that the sub-image covers a desired surface area of the object as shown in FIG. 8(B). Next, as shown in FIG. 8(C), the bit map file is divided into a plurality of tracks. As shown in this example, no transmission will occur in the first track since this track contains no graphical information. Following the division of the graphical information into tracks, the image processing system also transforms the data based on the surface contours of the object. This transformation may involve altering the image data so that the lengths of the tracks correspond to the actual lengths of tracks on the object.

VI. Control Unit

A preferred embodiment of the control unit 60 will now be described with reference to FIG. 9. The control unit includes a spin bottom 61(A) and a spin top 61(B) between which the object O is secured. A clamp 66 maintains the object O between the spin top 61(B) and spin bottom 61(A) during the application of graphics to the object O. The clamp 66 may be automatically or manually actuated. A motor/encoder 68 is connected to the spin top 61(B) through a rotation pulley 64. Thus, through operation of the motor/encoder 68, the rotation pulley 64 is rotated and drives the spin top 61(B) in order to rotate the object O about its axis. The spin bottom 61A, spin top 61(B), rotation pulley 64, clamp 66, and motor/encoder 68 are mounted on a frame 62.

In the preferred embodiment, the encoder forming part of the motor/encoder 68 is a pulse-type encoder and is used for both monitoring angular position and the velocity of the object O. The spin bottom 61(A) and spin top 61(B) provide low friction gripping of the object once the object is clamped in position. The clamp 66 contains bearings, a spring, and a slide that provides force via the spin bottom 61(A) to hold the object O in place. Alternatively, the clamp may be under solenoid control for automatic loading and unloading of objects O.

Figure 9:
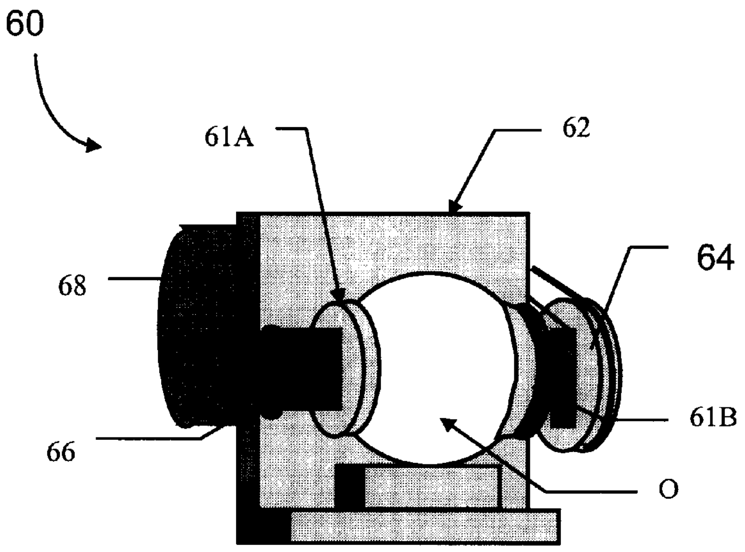
FIG. 9 is a diagram of a control unit according to a preferred embodiment of the invention.

In alternate embodiments, the object O may be secured in other ways than that shown in FIG. 9. For instance, the object O may be held in place through a vacuum, such as through a suction cup. In this example, the control unit 60 would not need the spin bottom 61(A) or the clamp 66. Other mechanisms and devices for holding an object and rotating the object will be apparent to those skilled in the art and are encompassed by the invention.

The encoder preferably provides 500 pulses per motor revolution in order to monitor the angular position and velocity of the object 0. The object is preferably rotated at speeds of up to 300 revolutions per minute. As a result, the control unit 60 must know the spin rotational position of the object. Using a 3:1 pulley ratio, the resolution is approximately at the control unit 60 is preferably 29, 295 counts per revolution although other resolutions may be chosen, such as a resolution of 9,750 counts per revolution using a pulley ratio of 1:1. A master or home pulse is generated each revolution and is transmitted through encoder optics which include photo transceivers coupling the control unit 60 to the graphics unit 30. The optics preferably comprise an optical receiver pod located on both the graphics unit 30 and on the control unit 60. The optical receiver pods preferably are linked through four channels with three channels allowing transmissions from the control unit 60 to the graphics unit 30 and one channel allowing communications in the opposite direction.

VII. Graphics Unit

Figure 10:
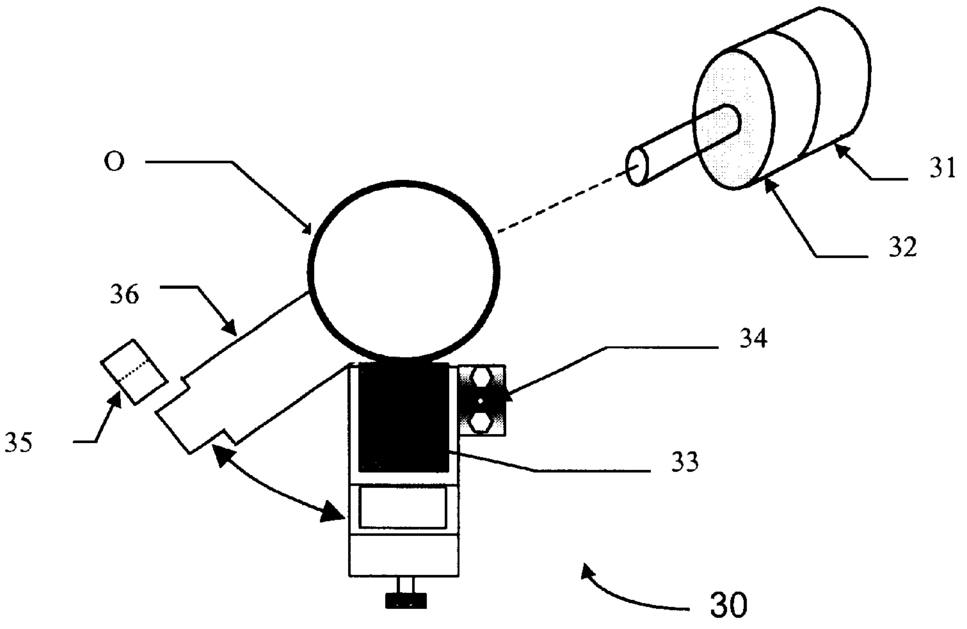
FIG. 10 is a diagram of a graphics unit according to a preferred embodiment of the invention.

A preferred embodiment of the graphics unit 30 is shown in FIG. 10. The graphics unit 30 includes an ink jet head 33 having an ink tank 34. In this preferred embodiment, the graphics unit 30 applies the graphics to the object O through the ink jet head 33. A position sensor 36 is mounted below the ink jet head 33 and rotates with it. The position sensor 36 detects the position of the ink jet head 33 and transmits this information through the optical receiver pod. A stepper motor 31 having an associated gear head 32 is mounted underneath the ink jet head 33 and controls the position of the ink jet head 33 along an arc about the object O. The stepper motor 31 and gear head 32 therefore move the ink jet head 33 from one track to the next track as the ink jet head 33 applies graphics to the object O. An over-travel sensor/stop is preferably placed at either end of this arc and thus defines the boundaries of the range of motion for the ink jet head 33.

Figure 11A:
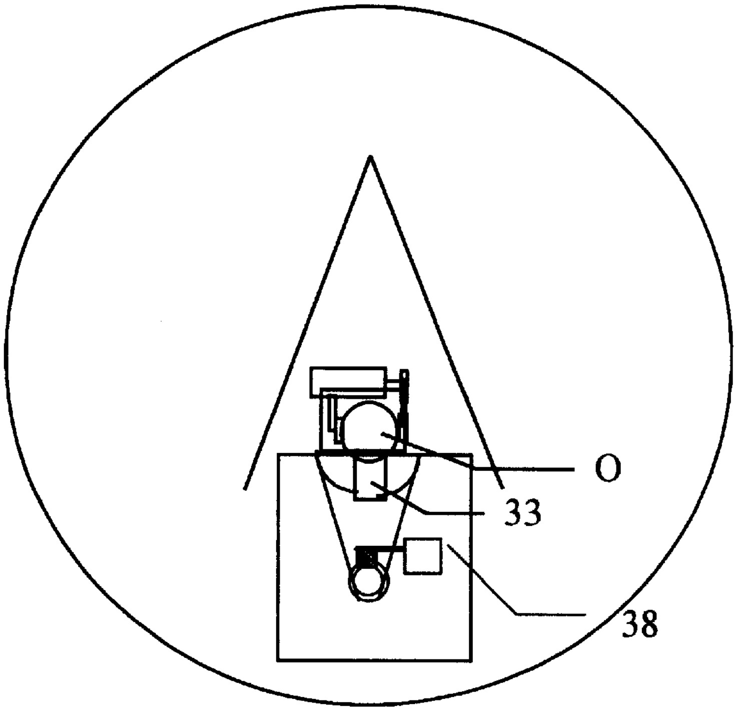
FIGS. 11(A) and 11(B) depict a method of moving the graphics unit along an arc in order to apply graphics to different tracks of an object.
Figure 11B:
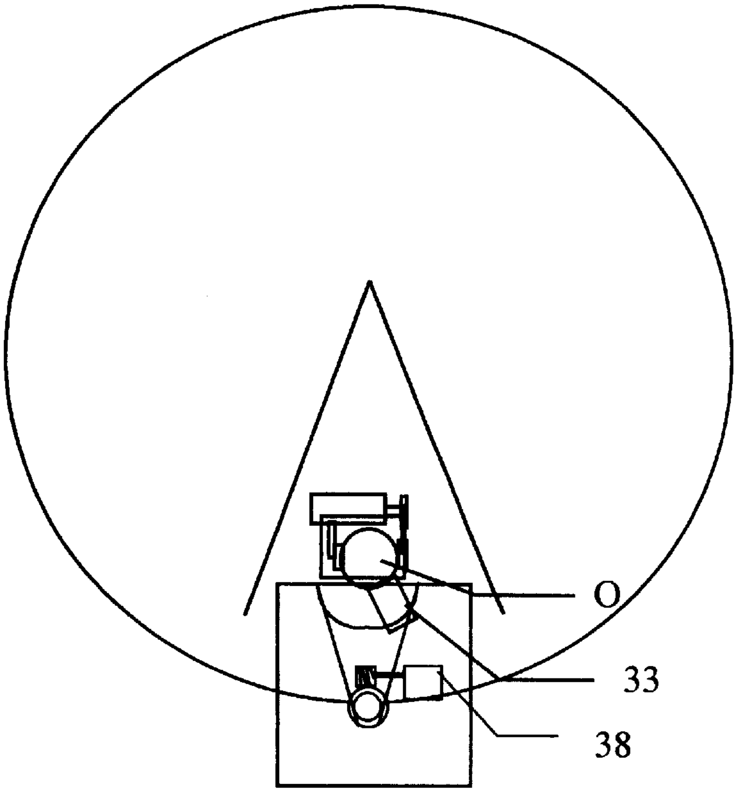

An illustration of an operation of the graphics unit 30 and control unit 60 relative to the multi-station machine 50 is shown in FIGS. 11(A) and 11(B). FIG. 11(A) shows the ink jet head 33 at the home position H relative to the object O. In this example, the position of the ink jet head 33 relative to the object O is controlled by a tracking motor 38 which is coupled to a worm gear and belt to cause the graphics unit 30 to move along an arc relative to the object O. The illustration of this tracking motor 38 and worm gear arrangement is for illustration purposes only and it should be understood that the preferred mechanism for moving the graphics unit 30 relative to the object O is shown in FIG. 10. As shown in FIG. 11(B), after printing has been completed in one track, the motor 38 repositions the ink jet head 33 to a new track for the application of graphics on this new track of the object O. By repositioning the ink jet head 33 from one track to the next, graphics may be applied to the entire outer surface of the object O.

VIII. Ink Jet Unit

Figure 12:
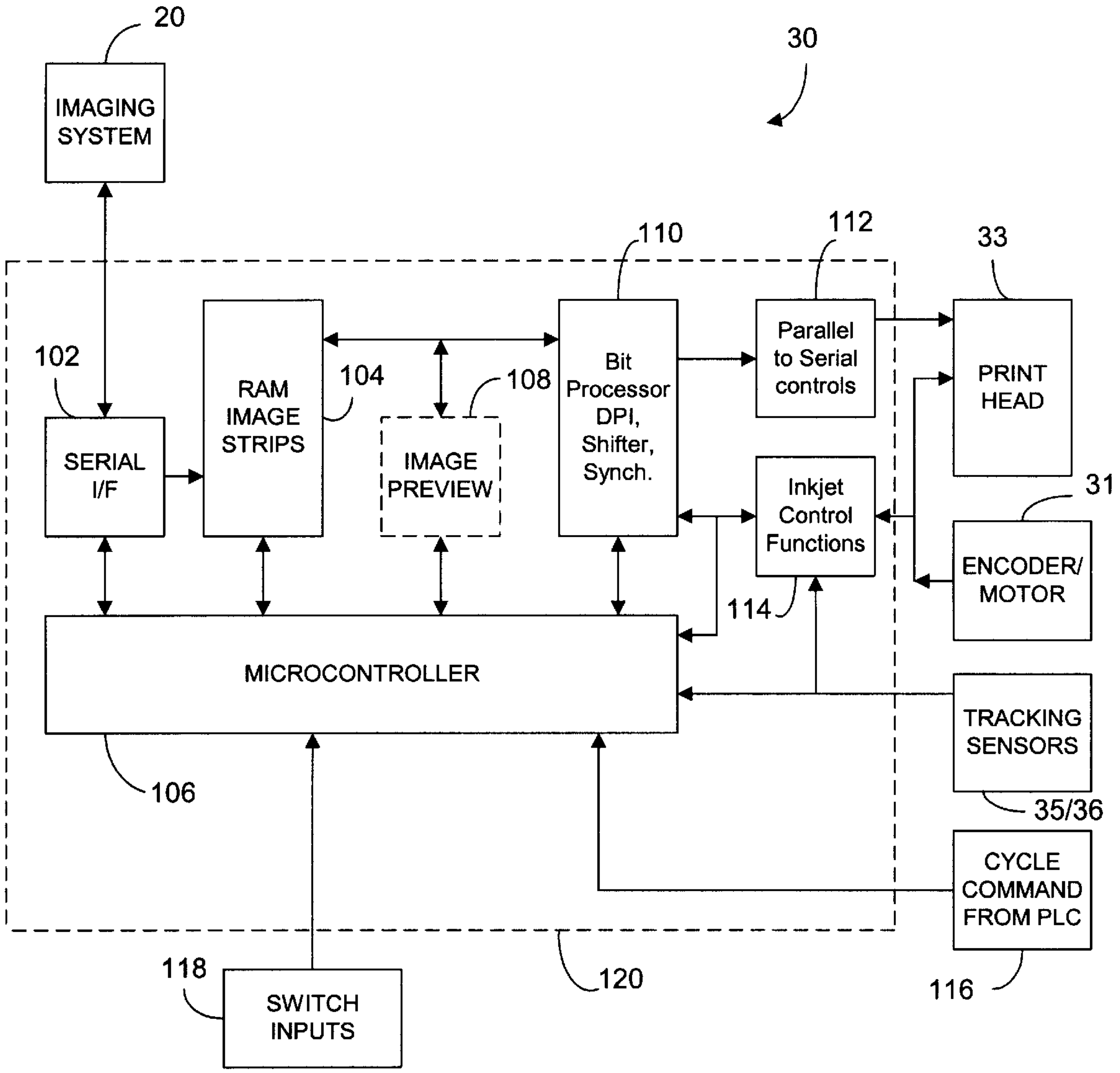
FIG. 12 is a schematic of an ink jet unit according to a preferred embodiment of the invention.

The graphics unit 30 preferably applies ink to an object through the ink jet head 33. A preferred embodiment of the graphics unit 30 is shown in FIG. 12. The graphics unit 30 includes the ink jet head 33, the rotational encoder and motor 31, and various sensors 35/36, such as for detecting the position of the ink jet head 33. The graphics unit 30 also includes an ink jet controller unit (ICU) 120, which includes a microcontroller 106 for communicating with the imaging system 20 through a serial interface 102.

A function of the ICU 120 is to receive image partitions from a windows driver via the serial interface 102 and to drive a piezo inkjet head 33 in order to deliver the desired image to a the object O. The inkjet head 33 is a preferably a piezo inkjet having model number P64/360/55 manufactured by XaarJet, which has its U.S. office in Alpharetta, Ga. This print head has delivers up to 360 dpi with 64 or 128 channels. The 64-channel unit is used due to the limits imposed by the curvature of the object and the 1 mm separation desired between the jet exit and the spherical object. The resulting number of active inkjets is the 64 available jets to maximize the width of each track to be jetted and to minimize the total number of tracks to complete the surface upon which the graphics are applied.

While the piezo inkjet head 33 in the ICU 120 preferably has 64 channels, it should be understood that other inkjet heads may be used that have other numbers of channels. Furthermore, in the preferred embodiment of the invention, the angle of the inkjet head 33 relative to the track can be altered in order to adjust the dpi resolution. When the inkjet head 33 is at a first angle, which is perpendicular to the track length, then the inkjet head 33 delivers a resolution of 180 dpi. By placing the inkjet head 33 at an angle, the track width is reduced whereby the 64 channels of the inkjet head 33 are pulled closer together and the resolution is increased. For instance, at an angle of 60 degrees, the resolution is increased to 360 dpi and at a angle of 68 degrees the resolution is increased to 480 dpi. The angle of the inkjet head 33 may be manually adjusted or adjusted automatically.

A function of the ICU 120 is to buffer the image data into partitions or strips and to store these strips in RAM 104. The strips are then asynchronously transferred serially out to the inkjet head 33 units along with the associated controls for interfacing with electronics in the inkjet unit 33. Due to the curved nature of spherical objects, tracks of image strips near the top and bottom of the spherical object are shorter than strips near the center. Since the object is rotating at a constant speed, each strip's surface velocity will vary and be minimal near the top/bottom of the spherical object and be at a maximum at the center of the object. Therefore, the frequency of inkjetting decreases for the shorter image strips near the top/bottom of the spherical object and increase for the image strips near the center of the spherical object.

The ICU 120 controls the frequencies of inkjetting. The microcontroller 106 reads signals from the encoder 31 and tracking sensors 35 and 36 when generating a start command for inkjetting each image strip. The encoder 31 has an output signal that provides a "home" pulse per motor revolution and a pulse stream, such as 500 pulses per revolution. These tracking signals inform the microcontroller 106 of when a new track position has been reached and stabilized. The microcontroller 106 begins inkjetting for each new track when the "home" pulse is received and proceeds based on a rate or frequency relative to the encoder 31 input pulse rate for a given spherical object rotational angular velocity. The rotational angular velocity can be calculated from the time between "home" pulses. To ensure that an image does not become rotationally compressed, the rotational angular velocity is compensated for. This also ensures that a wrap-around (full 360 degree) image begins and ends at the same point. This also provides for a variable rotational speed system operation.

The inputs and outputs of the ICU 120 are preferably TTL (5 volt) compatible levels unless otherwise specified. A 5 volt power supply is provided as part of the ICU 120 to power both the ICU 120 and the print head 33. A print head main 35 volt power supply is provided to power print head functions 114 only. The print head data is transmitted serially from the microcontroller 106 in the ICU 120 to the print head 33 and inkjet control functions 114.

The ICU 120 preferably receives the following inputs: "home" pulse, encoder pulses, run/load signal, reset signal, home position sensor, track position overrun top, track position overrun bottom, E-stop, Print cycle (command), as well as power inputs. The ICU 120 preferably has the following outputs: tracks done (ready to index), status (station), fault, and print head Data/Control. The microcontroller 106 is preferably a PIC 16C76 microcontroller manufactured by Microchip Technology Inc. of Chandler, Ariz. The ICU 120 may also includes an image preview 108 for allowing an operator to view the graphics that are to be applied to the object. The image preview 108 includes a display screen, such as LED array or LCD screen. The ICU 120 also receives a cycle command 116 from the PLC controller 23. The PLC controller 23 may be any suitable PLC and may be programmed in ladder logic or may comprise a SoftPLC package running on a computer.

IX. Ink Jet Methods

A description will now be given of a preferred method by which the ICU 120 operates. The method is illustrated in FIGS. 13(A) to 13(I). In general, the method involves taking standard image formats, making a spherical transformation using a "dither" technique, performing color separation, and sending strips from top to bottom to the ICU 120 via the serial interface 102 until the entire image is transmitted. This transfer process is preferably done when the ICU 120 is not doing any operation related to actual inkjetting to avoid producing a faulty image on the object. For this reason, the ICU 120 ensures that a Run/Load switch 118 is in a "Load" mode prior and during image transfers.

Figure 13A:
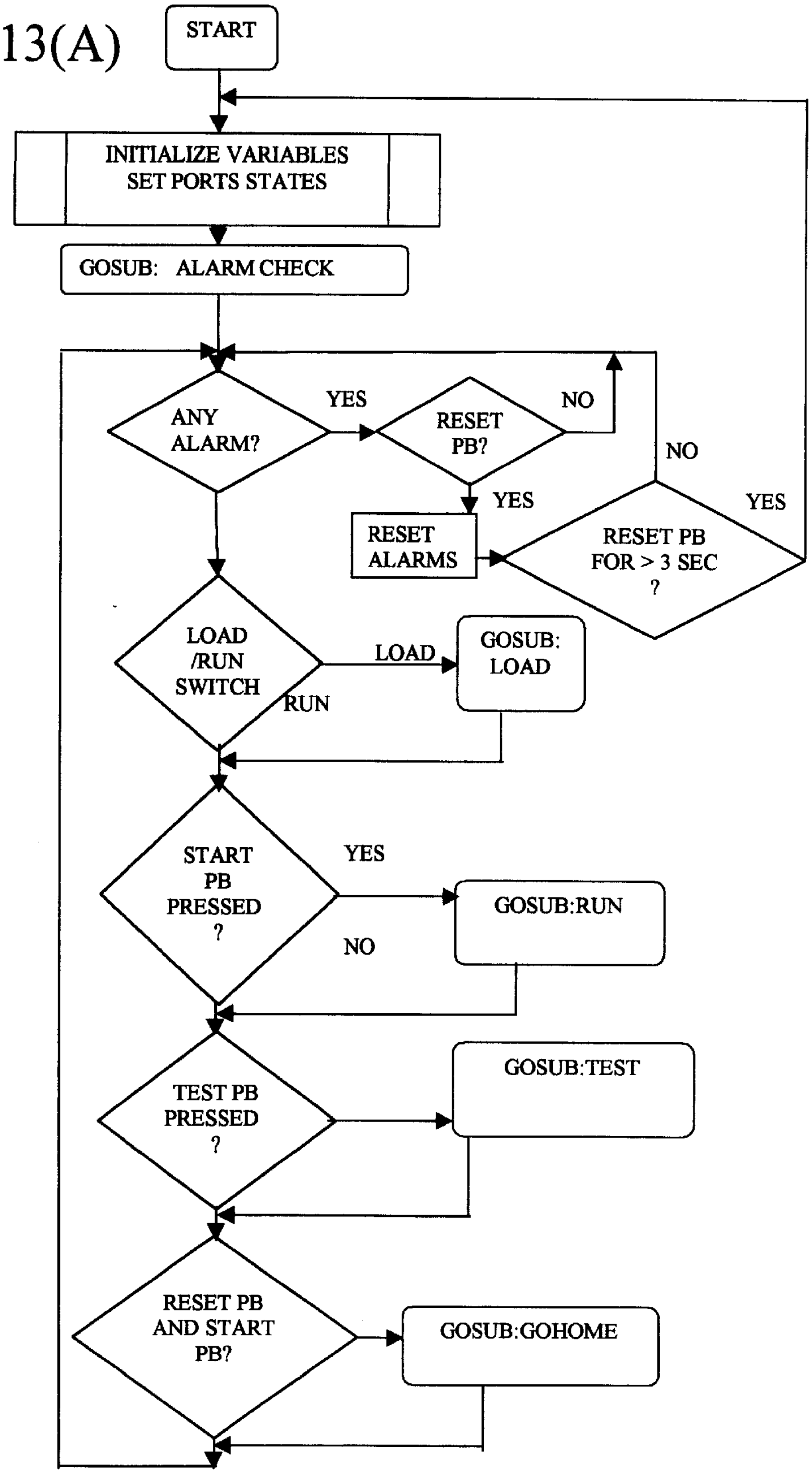
FIGS. 13(A) to 13(I) are flow charts depicting operations of the ink jet unit.
Figure 13B:
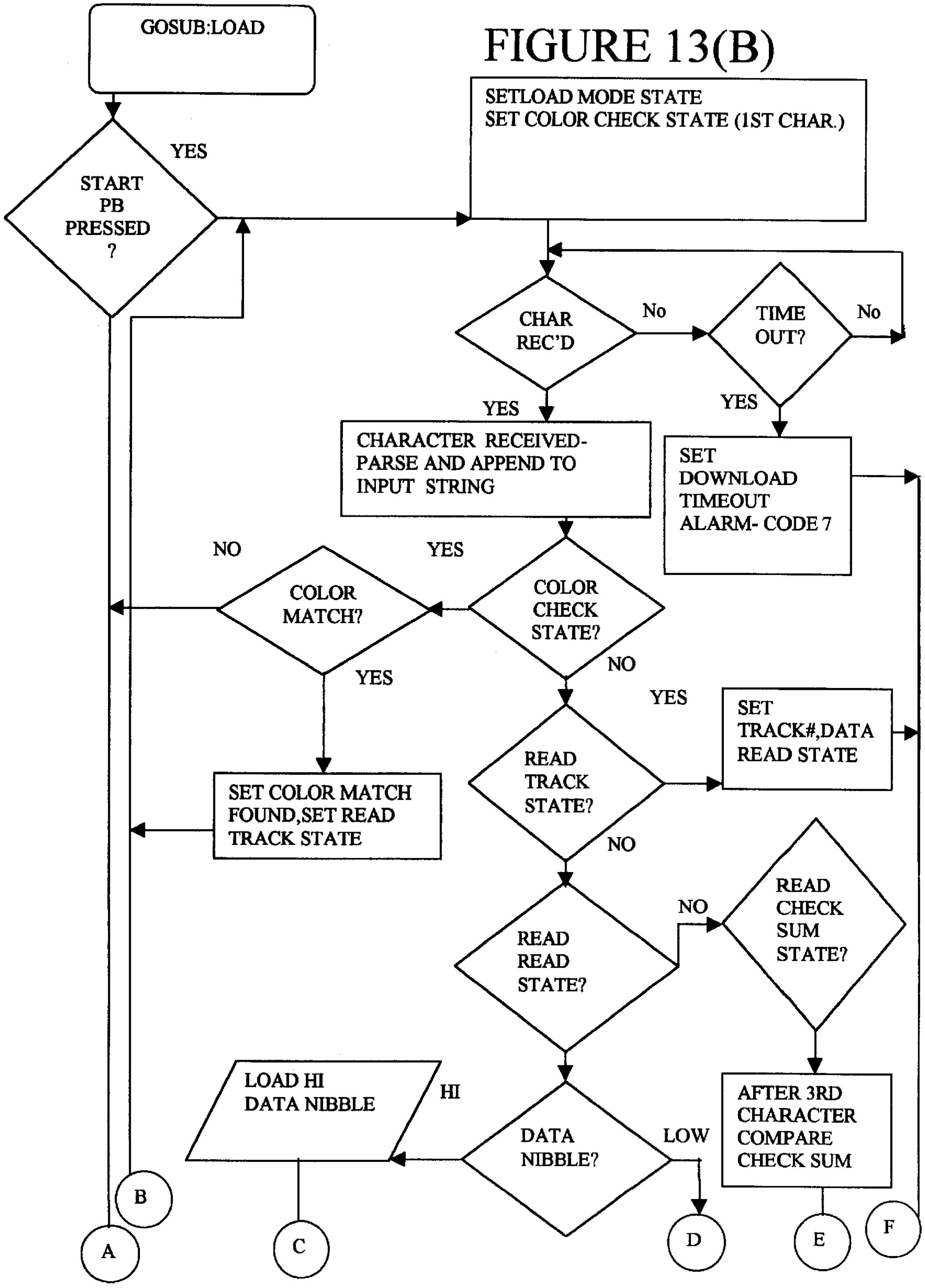
Figure 13C:
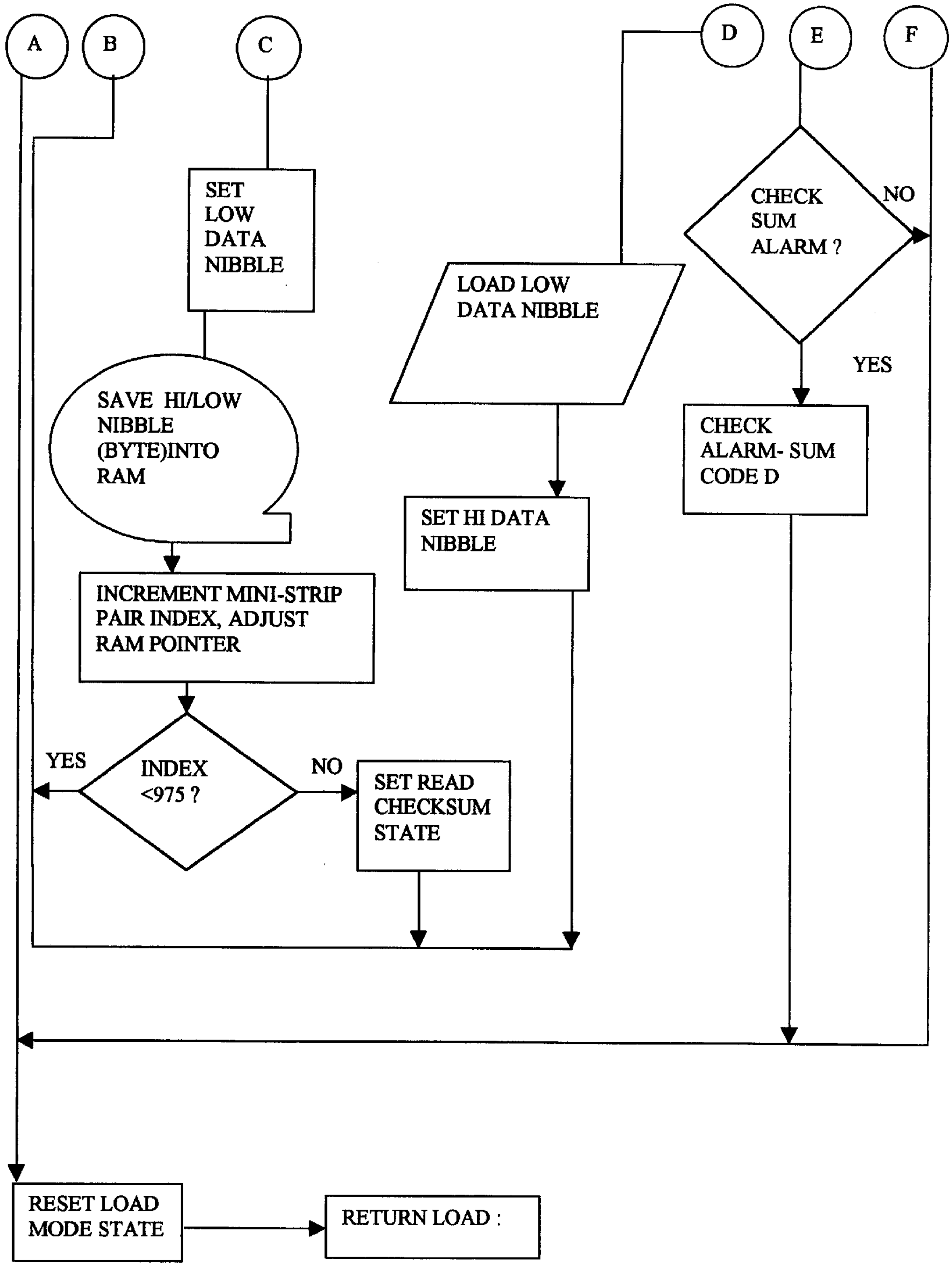
Figure 13:
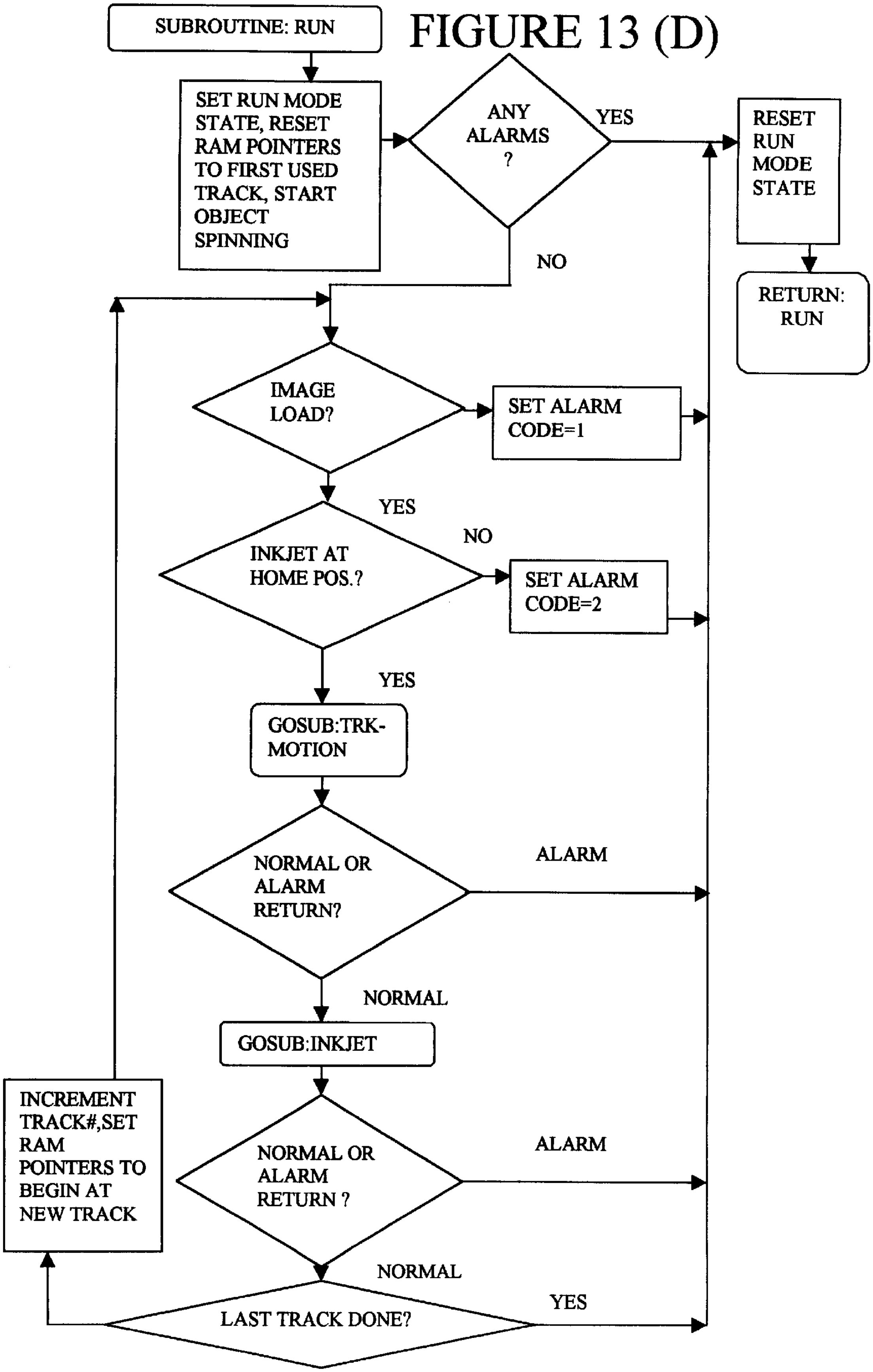
Figure 13:
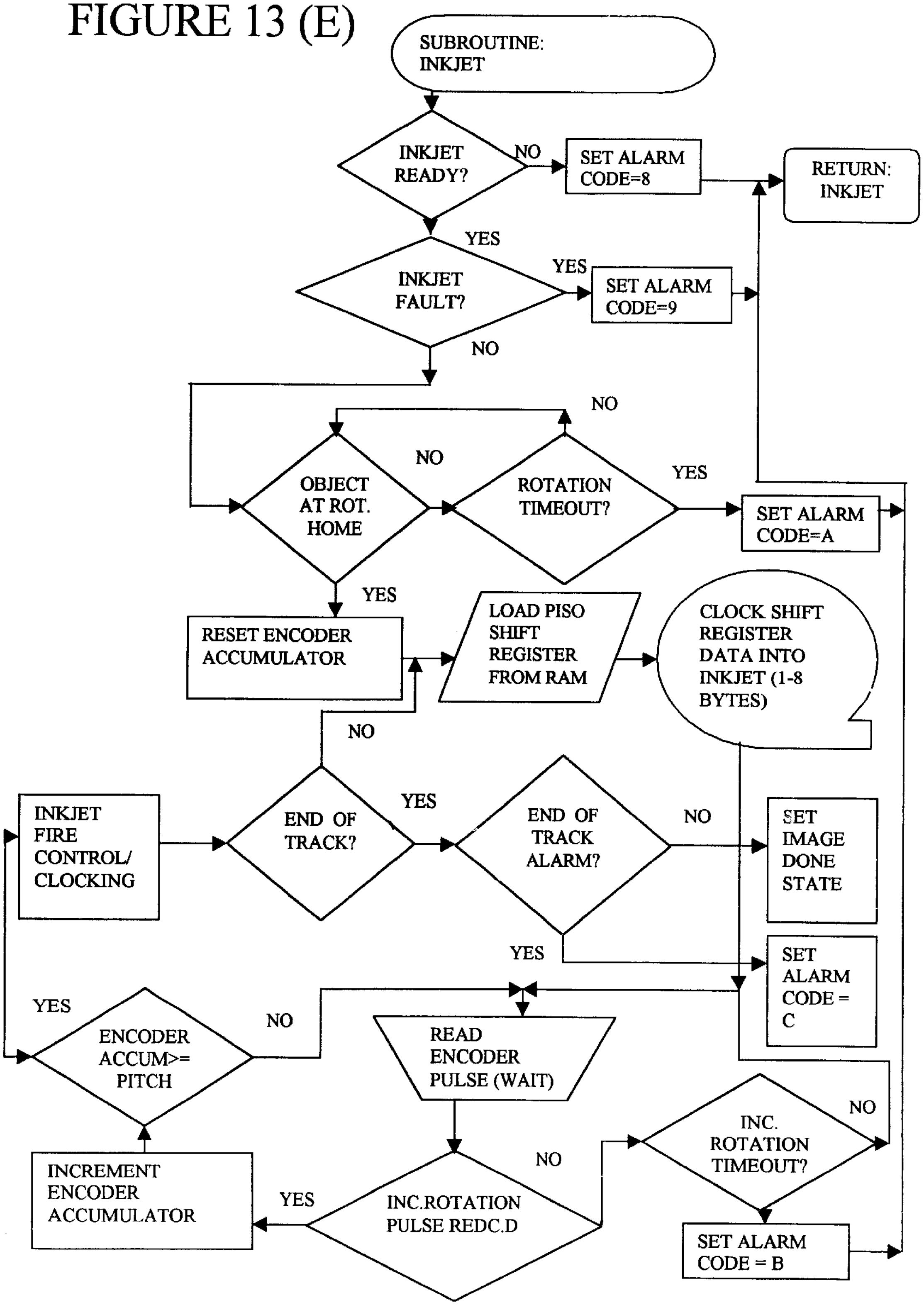
Figure 13F:
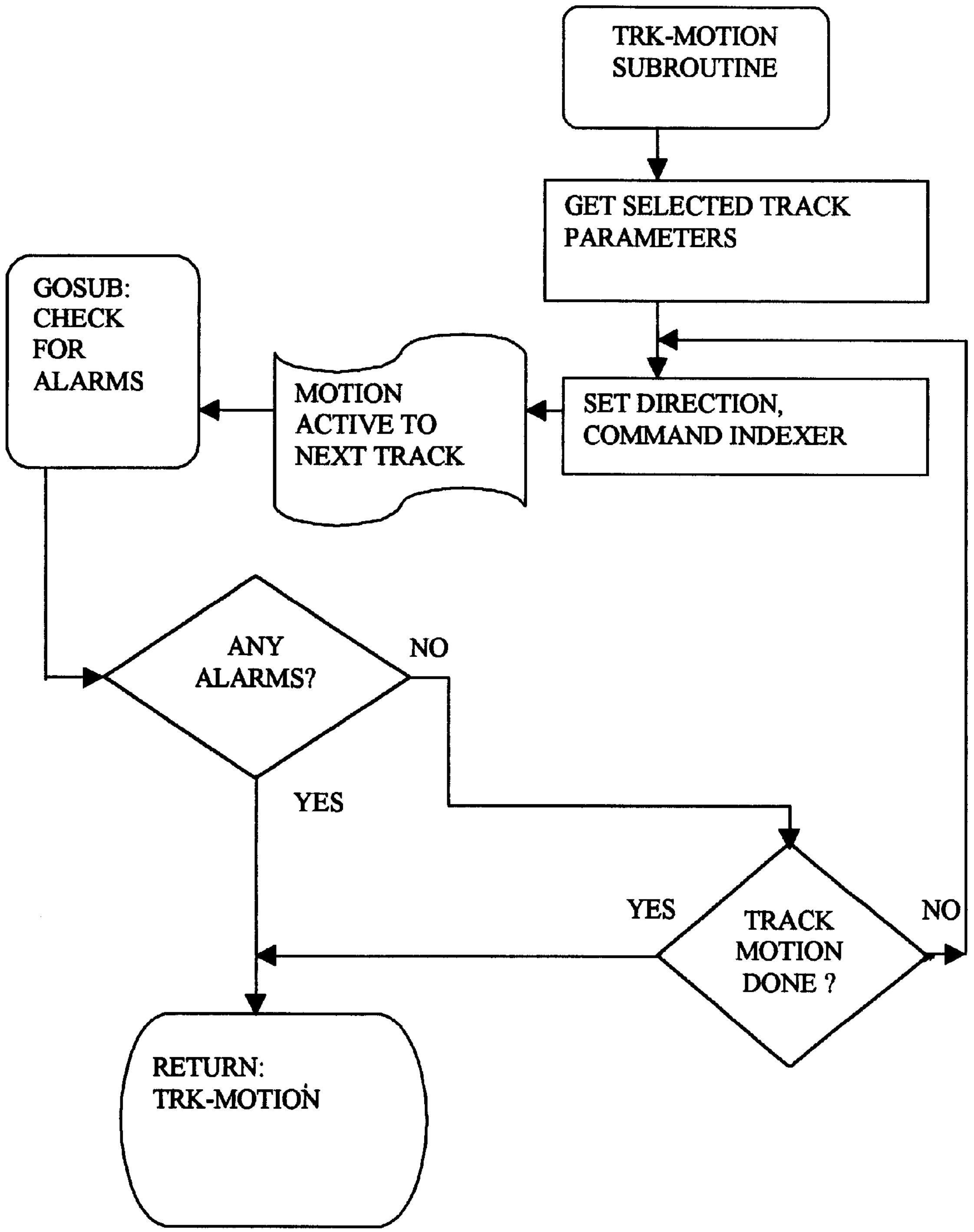
Figure 13:
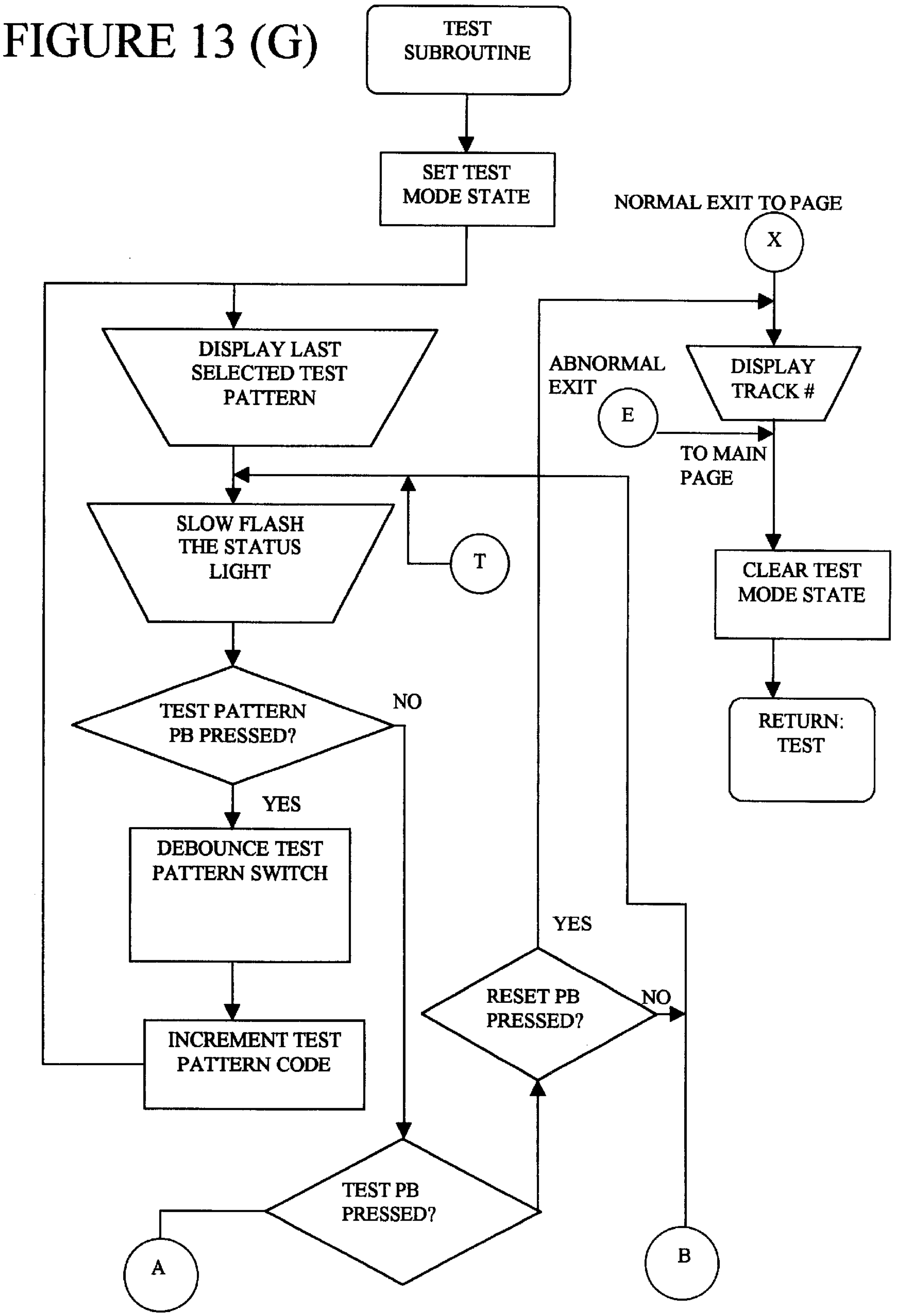
Figure 13H:
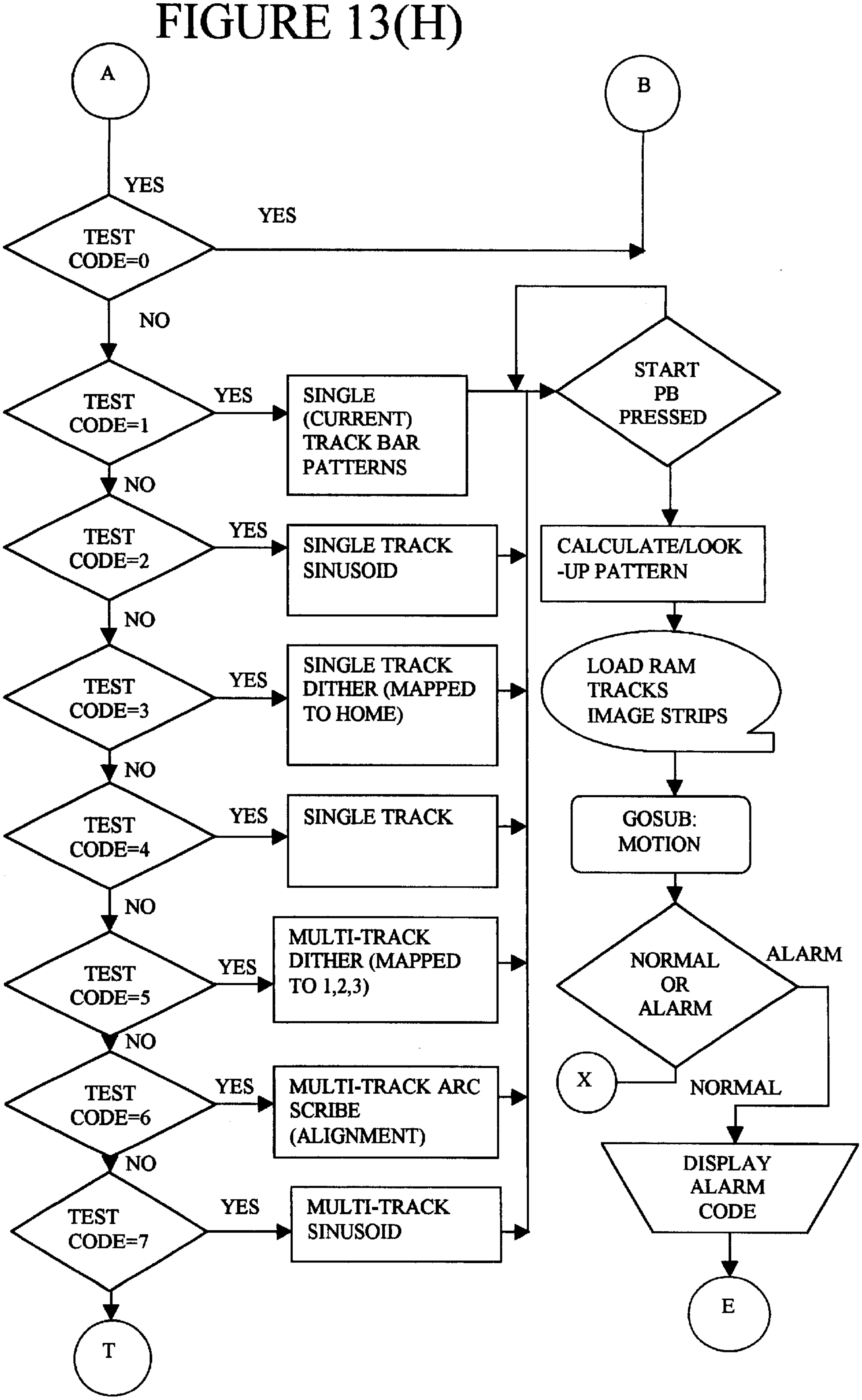
Figure 13I:
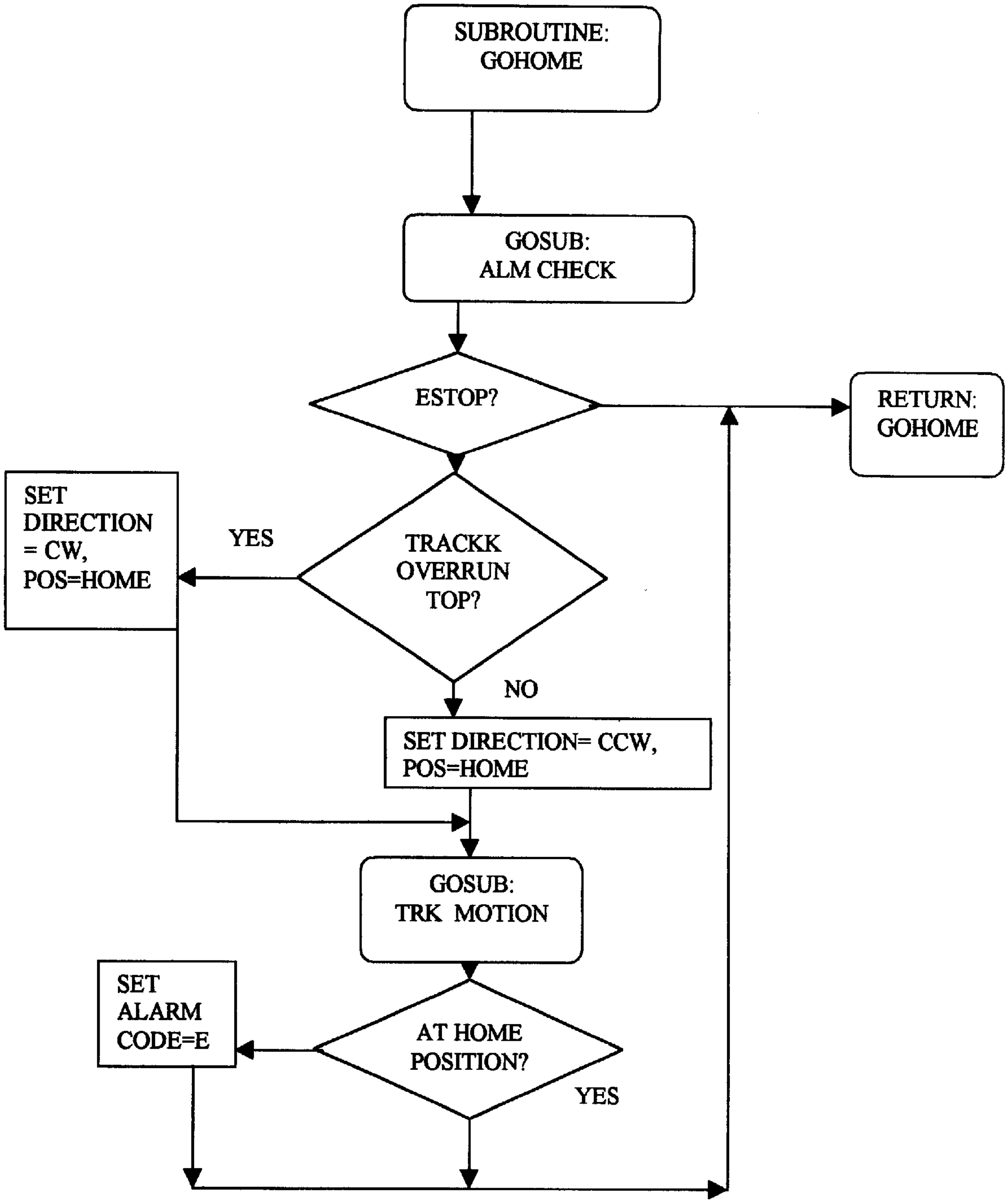

FIG. 13(A) illustrates a method of initializing the printing system 10. The method shown in FIG. 13(A) is performed by the microcontroller 106 and involves initializing variables, setting port states, and checking alarms. Additionally, the method involves checking the load/run switch, a reset switch, and a PB switch. The method shown in FIG. 13(B) and FIG. 13(C) is a load subroutine during which the graphics data is downloaded from the imaging system 20. FIG. 13(D) illustrates a run subroutine which involves checking for alarms, loading the image data, placing the inkjet 33 at the home position, applying the graphics to a track, and then incrementing the graphics unit to the next track until graphics have been applied to all tracks. FIG. 13(E) illustrates an inkjet subroutine which generally involves determining whether the inkjet is ready, placing the inkjet at the proper position relative to the object, and serially applying the graphics along a track on the object. FIG. 13(F) illustrates a tracking motion subroutine for controlling the movement of the graphics unit 30 from one track to the next track. FIGS. 13(G) and 13(H) generally relate to a test subroutine for testing operation of the printing system 10. FIG. 13(I) depicts a go home subroutine for placing the graphics unit 30 at the home position. It should be understood that the methods described in FIGS. 13(A) to 13(I) are just one example of how the graphics unit 30 may be controlled to apply graphics to an object and that variations and modifications are encompassed within the invention.

The forgoing description of the preferred embodiments of the invention has been presented only for the purpose of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated.

What is claimed is:

1. A system for applying graphics to an object having a non-planar surface, comprising:

a fixture for receiving and holding the object having the non-planar surface;

a graphics unit for receiving graphics data and for applying the graphics to the non-planar surface of the object; and a control unit for moving the graphics unit about the non-planar surface relative to the object so that an output of the graphics unit is maintained at a desired position relative to the object;

wherein the graphics unit is not coupled to the fixture whereby the fixture can be moved independently of the graphics unit.

2. The system as set forth in claim 1, wherein the object has curved surfaces, the graphics unit is for applying graphics on the curved surfaces, and the control unit is for moving the graphics unit in an arc relative to the object.

3. The system as set forth in claim 1, wherein the control unit adjusts the position of the graphics unit relative to the object based on the non-planar surface of the object.

4. The system as set forth in claim 1, wherein the graphics unit includes an ink jet head.

5. The system as set forth in claim 1, wherein the fixture comprises at least one cup for holding the object.

6. A method of applying graphics to an object having a non-planar surface, comprising:

obtaining planar graphics data, the planar graphics data containing information on a planar image;

performing a spherical transformation of the planar graphics data to produce spherical graphics data;

receiving and holding the object having the non-planar surface;

receiving graphics data for being applied to the non-planar surface of the object;

moving a graphics unit relative to the object so that an output of the graphics unit is maintained at a desired distance to the object;

applying the graphics to the non-planar surface of the object; and maintaining the desired distance to the object even when the graphics are being applied along the non-planar surface of the object.

7. The method as set forth in claim 6, wherein the holding comprises securing the object between two mounts.

8. The method as set forth in claim 6, wherein the holding comprises securing the object by a vacuum mount.

9. The method as set forth in claim 6, wherein the moving of the graphics unit comprises moving an ink jet head relative to the object.

10. The method as set forth in claim 6, wherein the moving of the graphics unit relative to the object includes rotating the object.

11. The method as set forth in claim 6, wherein the applying of the graphics includes applying a track of the graphics along a portion of the object.

12. The method as set forth in claim 6, wherein the applying of the graphics comprises applying a single color of the graphics to the object.

13. The method as set forth in claim 6, wherein the object has a curved surface and the moving comprises moving the graphics unit in an arc relative to the object.

14. The method as set forth in claim 6, wherein the maintaining of the desired distance comprises adjusting a spacing between the output of the graphics unit and the object based on the non-planar surface.

15. The method as set forth in claim 6, wherein the applying of graphics comprises applying the graphics in more than one color.

16. A facility for applying graphics to a plurality of objects having non-planar surfaces, comprising:

a receiving station for holding the plurality of objects; and a printing system for receiving the objects from the receiving station and for applying the graphics to the objects along the non-planar surfaces, the printing system including a plurality of graphics stations each applying a unique color in the graphics to-the object;

wherein each graphics station comprises:

a fixture for holding one of the objects;

a graphics unit for receiving graphics data for its respective color and for applying the respective color of graphics to the object along the non-planar surface; and a control unit for moving the graphics unit relative to the object so that an output of the graphics unit is maintained at a desired distance to the object.

17. The facility as set forth in claim 16, wherein the receiving station comprises a hopper.

18. The facility as set forth in claim 16, wherein the printing system further includes an imaging system for separating graphics information into individual color graphics data and for delivering the individual color graphics data to the graphics stations.

19. The facility as set forth in claim 16, further comprising an indexing table and wherein the fixtures are mounted on the indexing table, the graphics stations are spaced around a perimeter of the indexing table, and the objects are moved by the indexing table to the plurality of graphics units so that each color in the graphics may be applied to the objects.

20. The facility as set forth in claim 16, further comprising a kiosk and wherein the graphics stations are mounted in the kiosk along a path, and the objects are moved to the plurality of graphics stations so that each color in the graphics may be applied to the objects.

21. The facility as set forth in claim 16, further comprising a packaging station for placing sets of the objects having the graphics in packages.

22. The facility as set forth in claim 21, wherein the packaging station places a predetermined number of objects into each package.

23. The facility as set forth in claim 16, wherein the objects are essentially spherical.

24. The facility as set forth in claim 16, wherein the objects have curved surfaces, the graphics units are for applying graphics on the curved surfaces, and the control units are for moving the graphics units in an arc relative to the objects.

25. The facility as set forth in claim 16, wherein each graphics station separates its graphics data into a plurality of tracks and the graphics unit successively applies the tracks of graphics data to individual tracks on each object.

26. The facility as set forth in claim 16, wherein each control unit adjusts the position of its graphics unit relative to the object based on the non-planar surface of the object.

27. The facility as set forth in claim 16, further comprising at least one drying station for drying the graphics applied to the object.

28. A method of applying graphics to a plurality of objects having non-planar surfaces, comprising:

receiving the plurality of objects having the non-planar surfaces; and applying the graphics to each of the objects, wherein the applying of graphics to each object comprises:

placing each object at a first station;

applying a first set of graphics to each object with a first graphics unit at a first station;

accounting for differences in spacing between an output of the first graphics unit and the object during the applying of the first set of graphics;

placing each object at a second station;

applying a second set of graphics to each object with a second graphics unit at the second station; and accounting for differences in spacing between an output of the second graphics unit and the object during the applying of the second set of graphics;

wherein the graphics may be applied to the plurality of objects even though the objects have the non-planar surfaces.

29. The method as set forth in claim 28, further comprising packaging the objects having the graphics.

30. The method as set forth in claim 28, wherein the applying of graphics further comprises:

placing each object at a third station;

applying a third set of graphics to each object with a third graphics unit at the third station; and accounting for differences in spacing between an output of the third graphics unit and the object during the applying of the third set of graphics.

31. The method as set forth in claim 28, wherein the applying of the graphics to each object includes moving each object from the first station to the second station after the applying of the first set of graphics.

32. The method as set forth in claim 28, wherein the applying of the graphics includes moving object from the first station to the second station after the applying of the first set of graphics.

33. The method as set forth in claim 28, wherein the accounting for differences comprises maintaining a desired distance between the output of the graphics unit and the object based on the non-planar surface of the object.

34. The method as set forth in claim 28, wherein the applying of the first set of graphics and the applying of the second set of graphics include rotating the object as the first and second sets of graphics are being applied.

35. The method as set forth in claim 28, wherein the applying of graphics comprises placing each object at multiple stations for applying graphics in multiple colors.

36. The method as set forth in claim 28, further comprising drying the graphics applied to each object.

37. The method as set forth in claim 36, wherein the drying comprises applying heat to each object.

38. The method as set forth in claim 36, wherein the drying comprises directing radiation to each object.

39. The system as set forth in claim 1, further comprising a second graphics unit and wherein the fixture can be moved from the graphics unit to the second graphics unit.

40. The system as set forth in claim 1, further comprising a second station and wherein the fixture can be moved between the graphics unit and the second station.

41. The system as set forth in claim 40, wherein the second station is a loading station for loading the object to the fixture.

42. The system as set forth in claim 40, wherein the second station is an unloading station for unloading the object from the fixture.

43. The system as set forth in claim 40, wherein the second station is a drying station.

44. The system as set forth in claim 1, further comprising a wireless communications interface between the control unit and the fixture.

45. The system as set forth in claim 44, wherein the interface is for transferring information on an angular position of the object from the fixture to the control unit.

46. The system as set forth in claim 44, wherein the interface is for transferring commands from the control unit to the fixture.

47. A system for applying graphics to an object having a non-planar surface, comprising:

a fixture for receiving and holding the object having the non-planar surface;

a graphics unit for receiving graphics data and for applying the graphics to the nonplanar surface of the object; and a control unit for moving the graphics unit relative to the object so that an output of the graphics unit is maintained at a desired distance to the object;

wherein, by moving the graphics unit relative to the object, the control unit maintains the desired distance to the object when graphics are being along the non-planar surface of the object and wherein the fixture is for holding the object at only one side of the object whereby graphics may be applied to an opposite side of the object.

48. The system as set forth in claim 47, wherein the fixture comprises a vacuum cup for holding the object at the one side of the object.

49. The system as set forth in claim 47, wherein the fixture rotates the object while the graphics unit applies the graphics to the object.

50. The system as set forth in claim 47, wherein the graphics unit includes a multi-color print head.

51. A system for applying graphics to an object having an essentially spherical shape, comprising:

a fixture for receiving and holding the essentially spherical object;

a graphics unit for receiving graphics data and for applying the graphics to the essentially spherical object; and a control unit for moving the graphics unit relative to the object so that an output of the graphics unit is maintained at a desired distance to the object;

wherein the graphics data comprise spherical graphics data obtained from a spherical transformation of planar graphics data.

52. The system as set forth in claim 51, wherein the graphics data are separated into tracks of graphics and the graphics unit applies at least one of the tracks of graphics on the object.

53. The system as set forth in claim 51, wherein the spherical transformation involves separating the planar graphics data into spherical graphics data of different colors.

54. The system as set forth in claim 51, wherein the spherical transformation performs dithering to compensate for polar compression of the graphics.

55. The system as set forth in claim 51, wherein one of the spherical graphics data or planar graphics data is transmitted to the graphics unit through the Internet.

56. The system as set forth in claim 51, wherein one of the spherical graphics data or planar graphics data is transmitted to the graphics unit through a local area network.

57. The system as set forth in claim 51, wherein one of the spherical graphics data or planar graphics data is stored locally at the graphics unit.

* * * * *